(12) United States Patent
Krupey

(10) Patent No.: US 11,597,062 B2
(45) Date of Patent: Mar. 7, 2023

(54) SOCKET ADAPTOR

(71) Applicant: Gary Raymond Krupey, Fenton, MO (US)

(72) Inventor: Gary Raymond Krupey, Fenton, MO (US)

( * ) Notice: Subject to any disclaimer, the term of this patent is extended or adjusted under 35 U.S.C. 154(b) by 16 days.

(21) Appl. No.: 17/474,976

(22) Filed: Sep. 14, 2021

(65) Prior Publication Data

US 2022/0134517 A1 May 5, 2022

Related U.S. Application Data

(60) Provisional application No. 63/107,631, filed on Oct. 30, 2020.

(51) Int. Cl.
| | | |
|---|---|---|
| *B25B 23/00* | (2006.01) | |
| *F16D 1/108* | (2006.01) | |
| *B25G 3/26* | (2006.01) | |
| *F16D 1/10* | (2006.01) | |

(52) U.S. Cl.
CPC ............ *B25B 23/0035* (2013.01); *B25G 3/26* (2013.01); *F16D 1/108* (2013.01); *F16D 2001/102* (2013.01)

(58) Field of Classification Search
CPC . B25B 23/0035; B25B 13/06; B25B 23/0014; B25B 21/00; B25G 3/26; F16D 1/108; F16D 2001/102; B23B 2231/04; B23B 31/10741; Y10T 279/3406; Y10T 279/3412; Y10T 279/17923; B25F 5/00
USPC .................... 81/177.85, 185, 124.6
See application file for complete search history.

(56) References Cited

U.S. PATENT DOCUMENTS

| | | | |
|---|---|---|---|
| 1,265,341 A | | 5/1918 | Keller |
| 2,110,397 A | | 3/1938 | Kangas |
| 2,304,038 A | | 12/1942 | Thompson |
| 2,464,381 A | | 3/1949 | Donaldson et al. |
| 2,837,381 A | | 6/1958 | Sarlandt |
| 3,298,261 A | * | 1/1967 | Lynn ..................... B25B 13/102 |
| | | | 81/185 |
| 3,549,160 A | | 12/1970 | Etzkorn |
| 4,266,453 A | | 5/1981 | Farley |
| 4,304,500 A | | 12/1981 | Faulk |
| 4,477,096 A | | 10/1984 | Wallace et al. |
| 4,583,430 A | | 4/1986 | Farley |
| 4,627,761 A | | 12/1986 | Olson et al. |
| 4,699,029 A | * | 10/1987 | Kelly .................. B25B 23/0035 |
| | | | 81/177.85 |
| 4,932,293 A | | 6/1990 | Goff |
| 6,076,436 A | | 6/2000 | Farley |
| 7,363,840 B1 | | 4/2008 | Farley |
| 9,511,483 B2 | | 12/2016 | Taylor, Jr. |
| 9,616,554 B2 | * | 4/2017 | Hendrix, II ............. B25B 13/18 |
| 10,543,587 B2 | * | 1/2020 | Chiang .................. B25B 13/06 |

(Continued)

OTHER PUBLICATIONS

Klutch 3 pc. Locking Pin and Retaining O-Ring Set; #662541, Photographed on Oct. 1, 2020; 1 page.

(Continued)

*Primary Examiner* — Lee D Wilson
*Assistant Examiner* — Jason Khalil Hawkins
(74) *Attorney, Agent, or Firm* — Harness, Dickey & Pierce, P.L.C.; Anthony G. Fussner

(57) ABSTRACT

Exemplary embodiments are disclosed of socket adaptors for retaining impact sockets to impact tools.

29 Claims, 21 Drawing Sheets

(56) References Cited

U.S. PATENT DOCUMENTS

| | | | |
|---|---|---|---|
| 11,084,149 B2* | 8/2021 | Wu | B25B 13/065 |
| 2002/0083801 A1* | 7/2002 | Cheng | B25B 13/06 |
| | | | 81/177.75 |
| 2004/0237730 A1 | 12/2004 | Hirakata | |
| 2008/0100006 A1 | 5/2008 | Chu | |
| 2014/0251092 A1 | 9/2014 | Taylor, Jr. | |
| 2015/0000475 A1 | 1/2015 | Meholovitch | |

OTHER PUBLICATIONS

Grey Pneumatic; https://www.toolsource.com/1-12-i-drive-impact-adaptors-c-449_561_1961/112-drive-x-5-extension-w-pin-hole--135431.html?tsqtid=) , Oct. 1, 2020; 6 pages.

GP103RA Grey Pneumatic 103RA Reducing Adapter Set 3 Pc, https://www.tooldeals4u.com/brand/grey-pneumatic-corporation); Oct. 1, 2020, 1 page.

Ironton Impact Adapters 8 pc. Set; NorthernTool.com; Oct. 1, 2020, 2 pages.

Reducing Adapter Set; www.gpsocket.com; Oct. 1, 2020, 1 page.

Williams 38006 ¾-inch Female x 1 Male Ipact Adapter; https://www.amazon.com/Williams-38006-4-inch-Female-Adapter/dp/B007YR8W1G; Nov. 3, 2012; 6 pages.

Milwaukee 2020 Cordless Catalog; https;//www.milwaukeetool.com/PDFViewer?file=https://www.milwaukeetool.com/-/media/PDFs/20-MTT-4173-Catalog_2020-Cordless-Catalog_V15-HR_Spreads.pdf; Oct. 1, 2020, 48 pages.

OZAT Impact Sockets; Copyright 2015; 6 pages.

Ingersall Rand Industrial Bolting Catalog; ingersollrandproducts.com/accessories; Oct. 1, 2020; 36 pages.

Special Square drive Adapters for use with Hydraulic Torque Wrenches; TULEX Idustrial Tools PVT.Ltd.; Oct. 1, 2020, 1 page.

\* cited by examiner

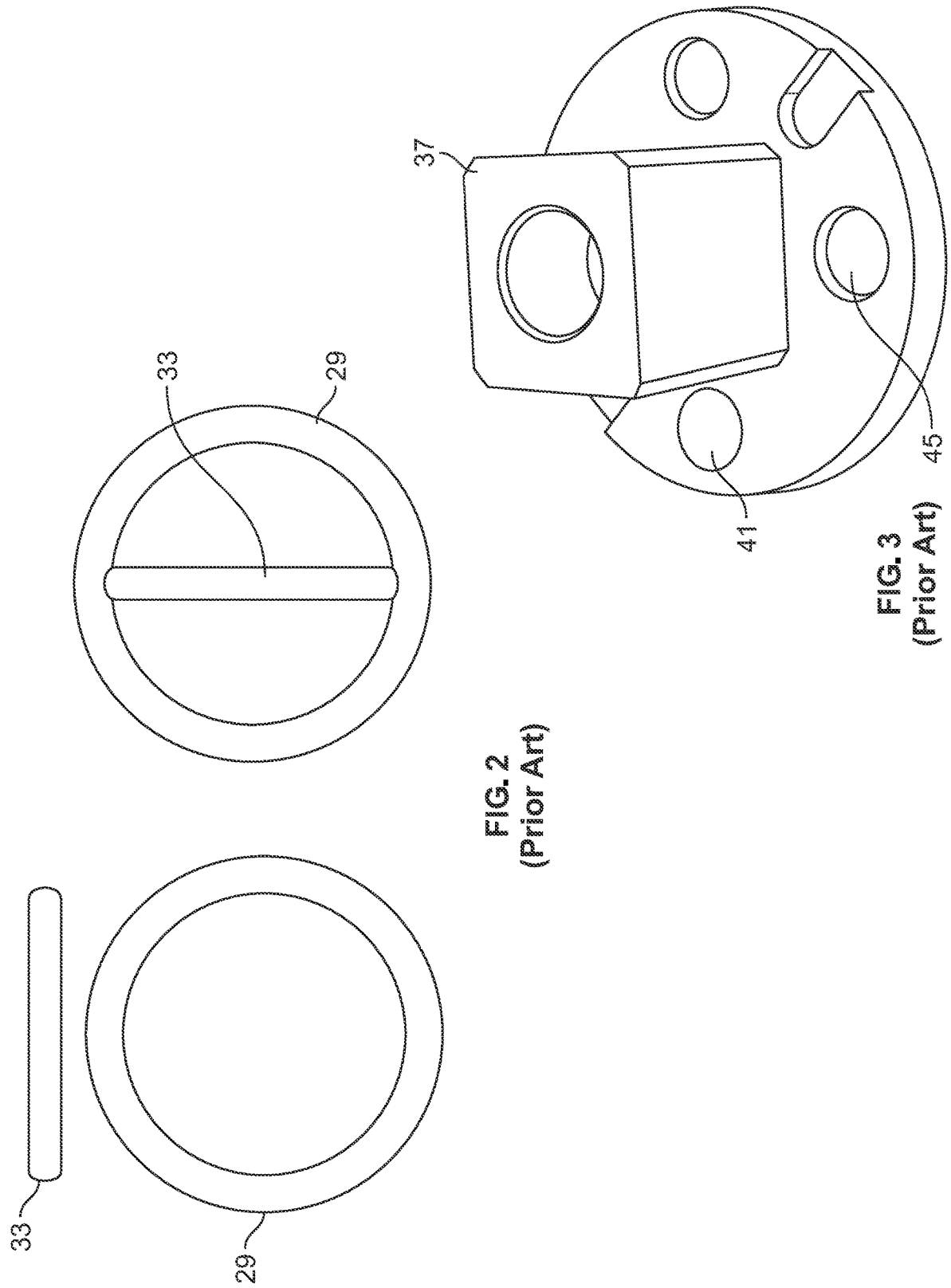

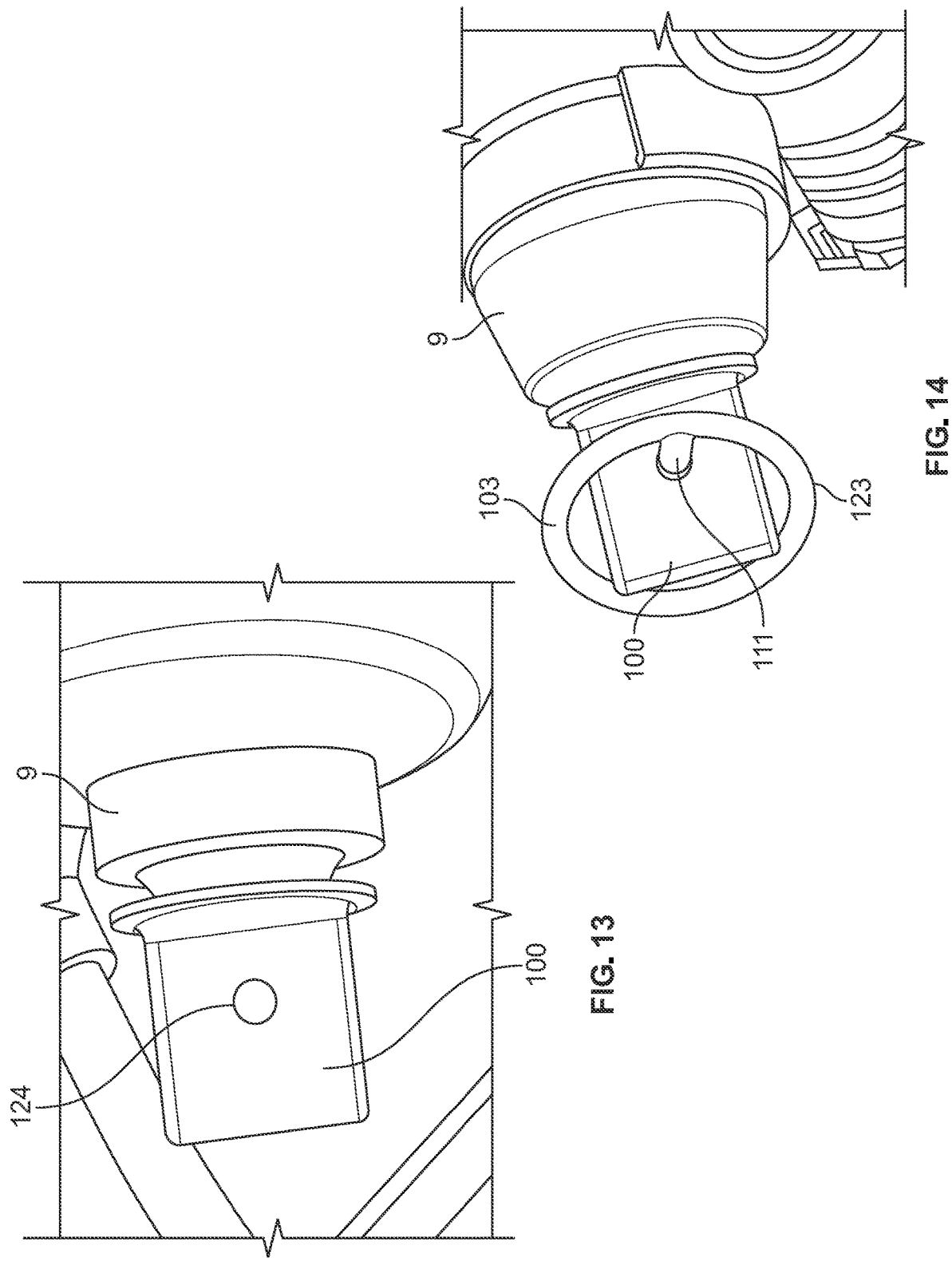

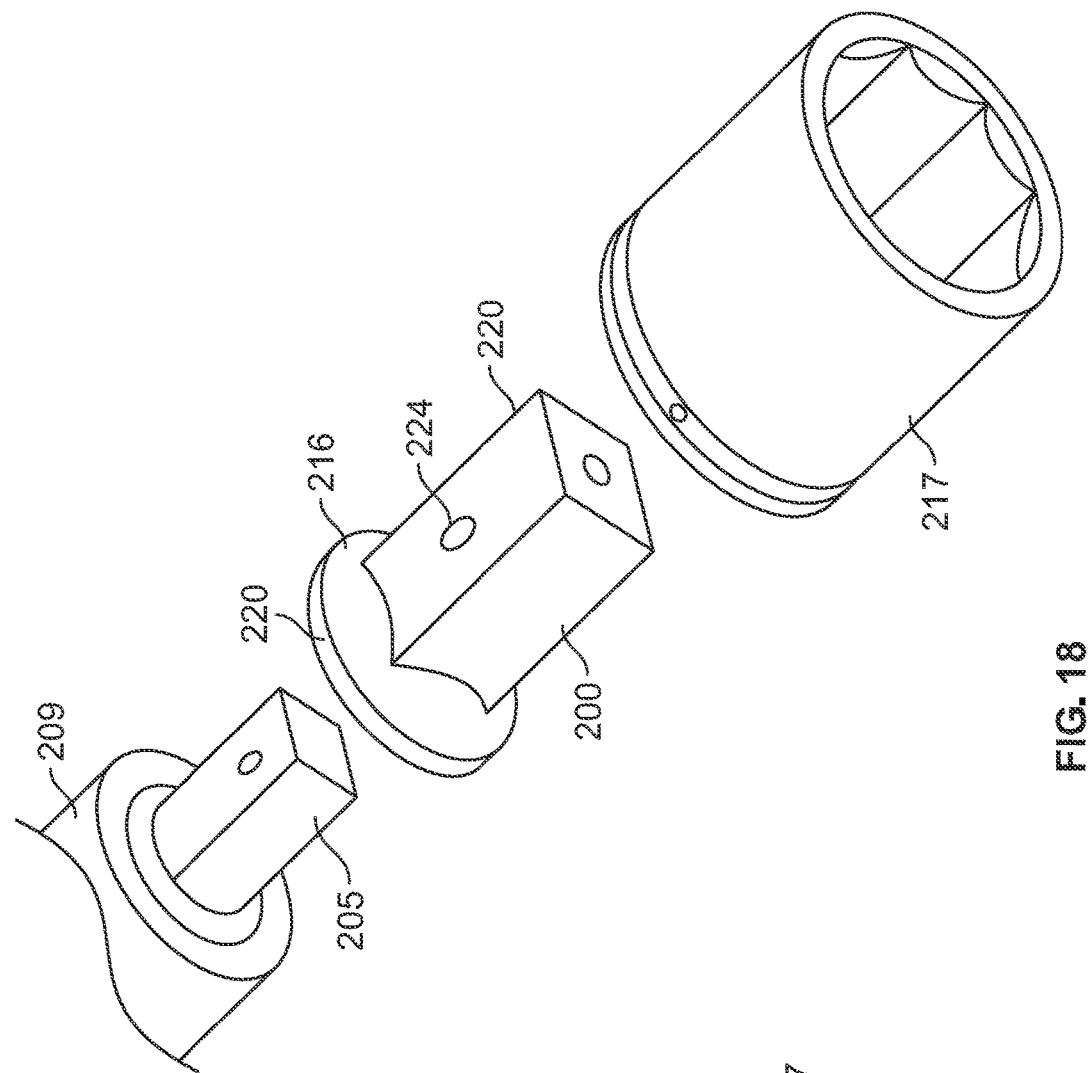
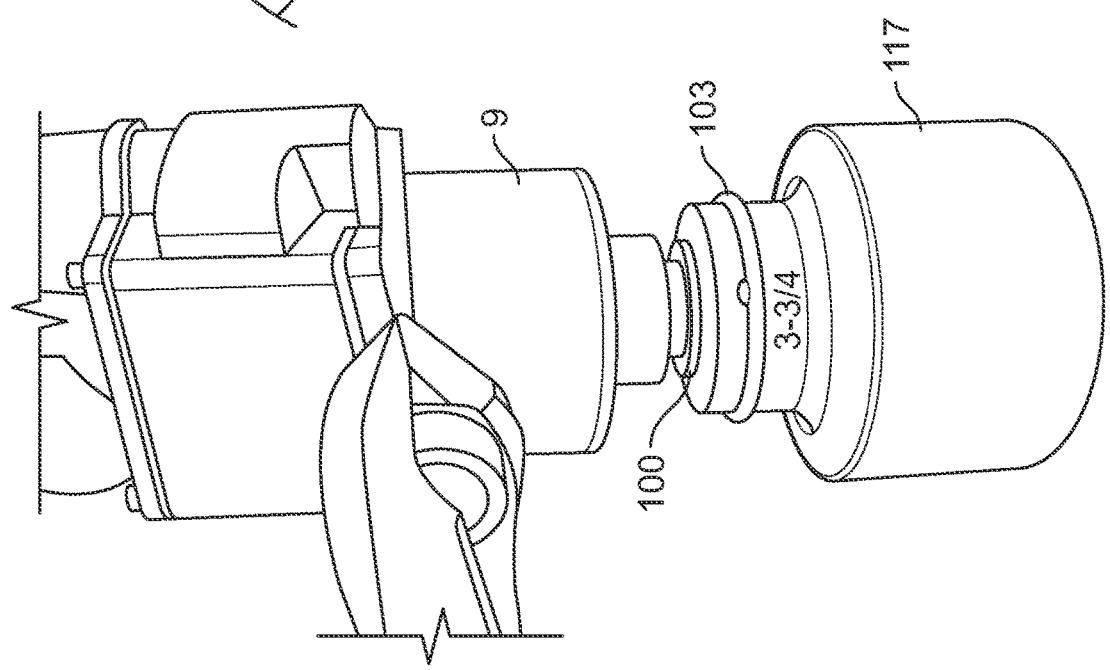
FIG. 18
FIG. 17

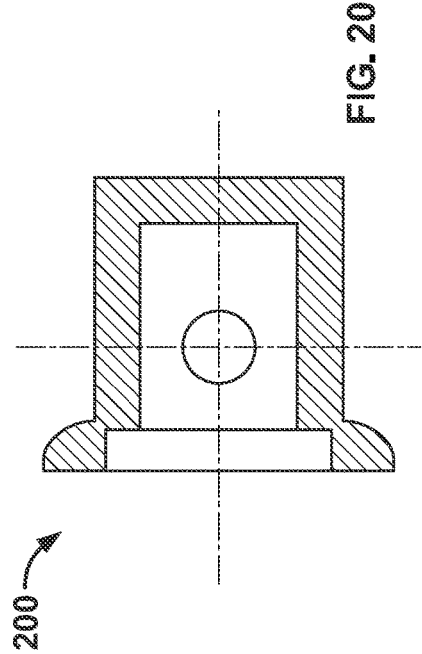
FIG. 20
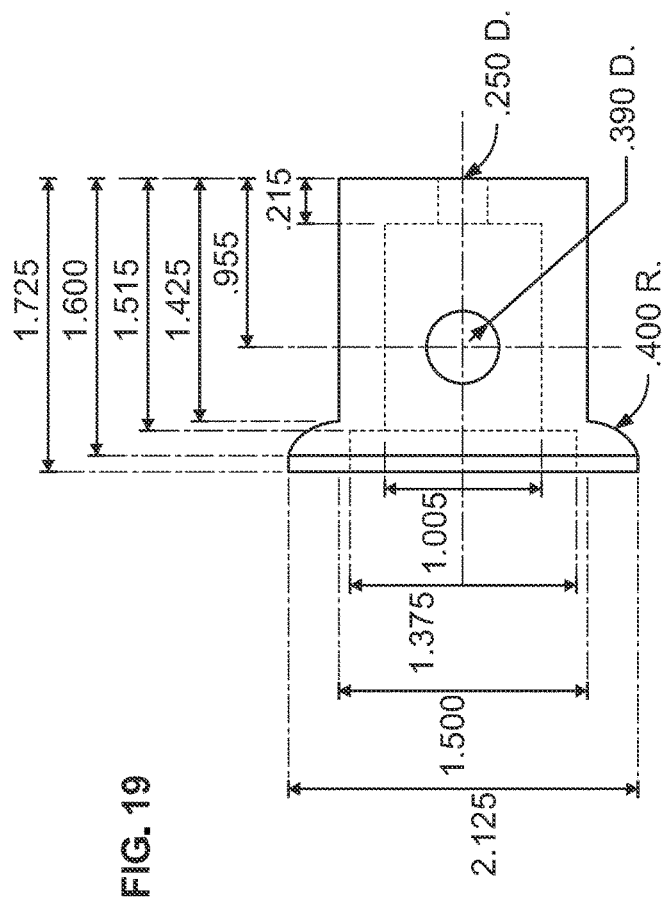
FIG. 19 FIG. 21
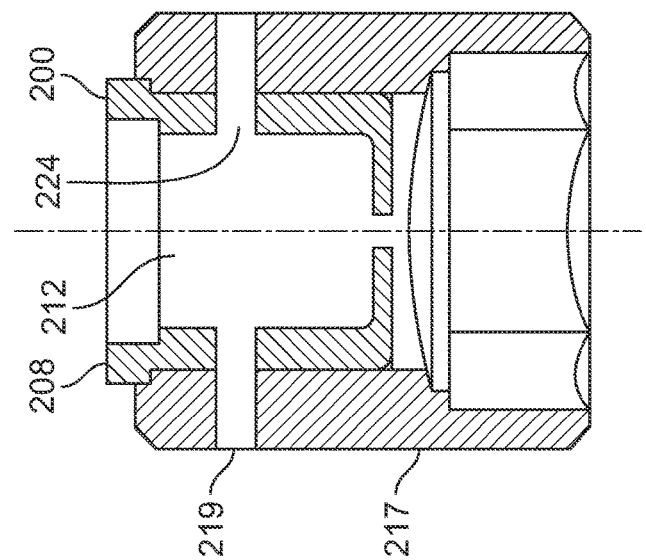
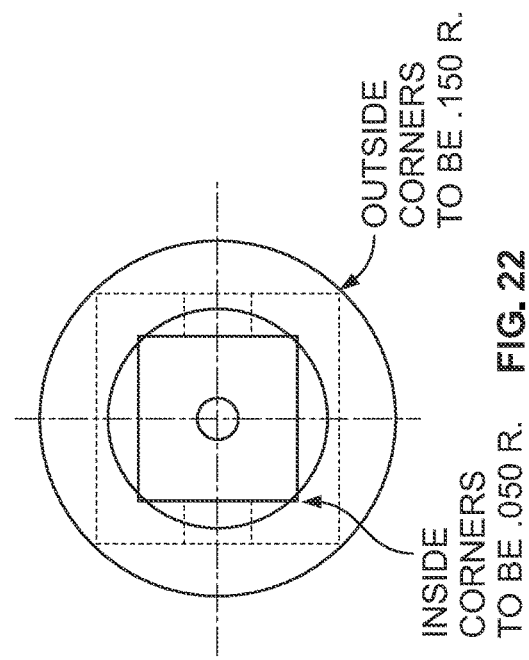
FIG. 22

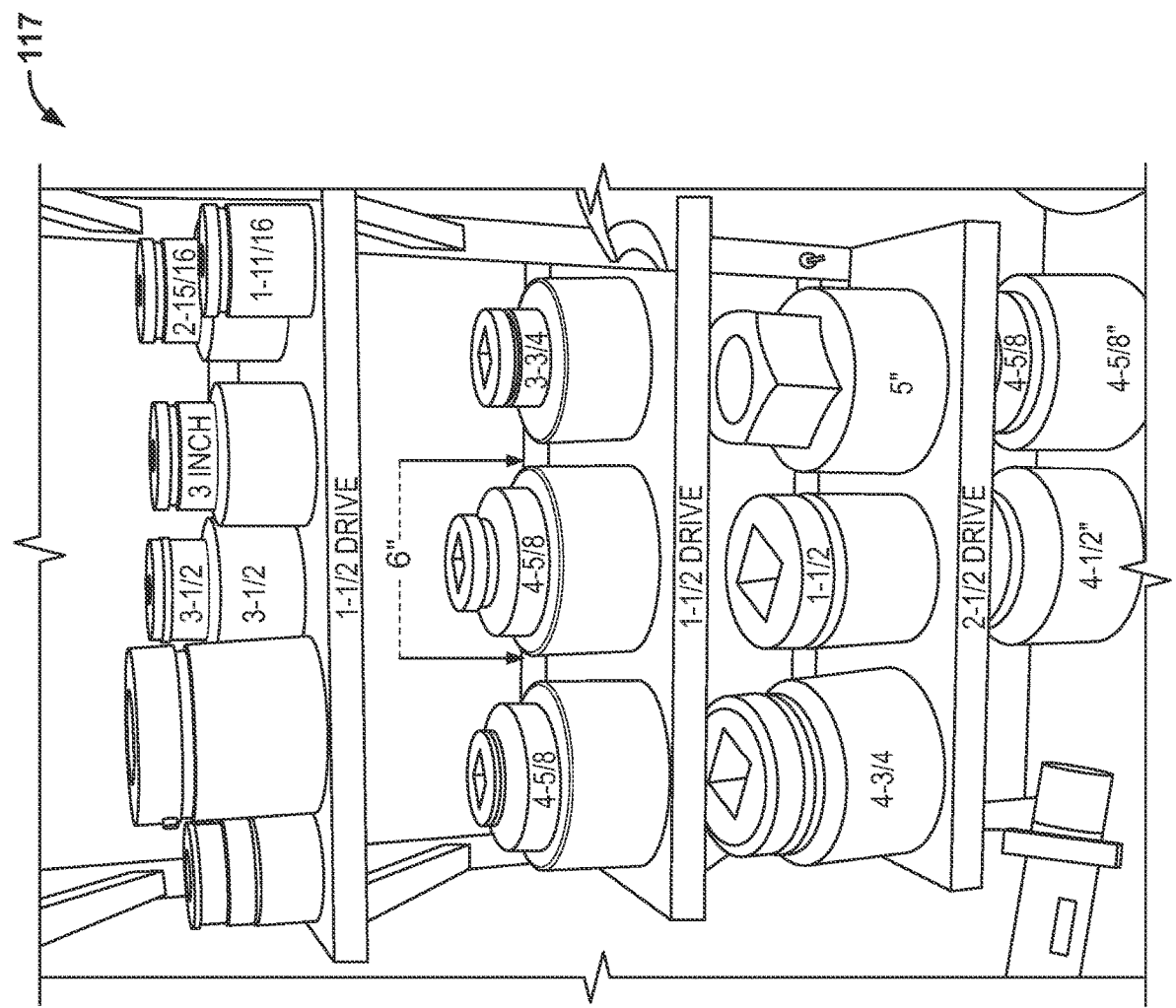

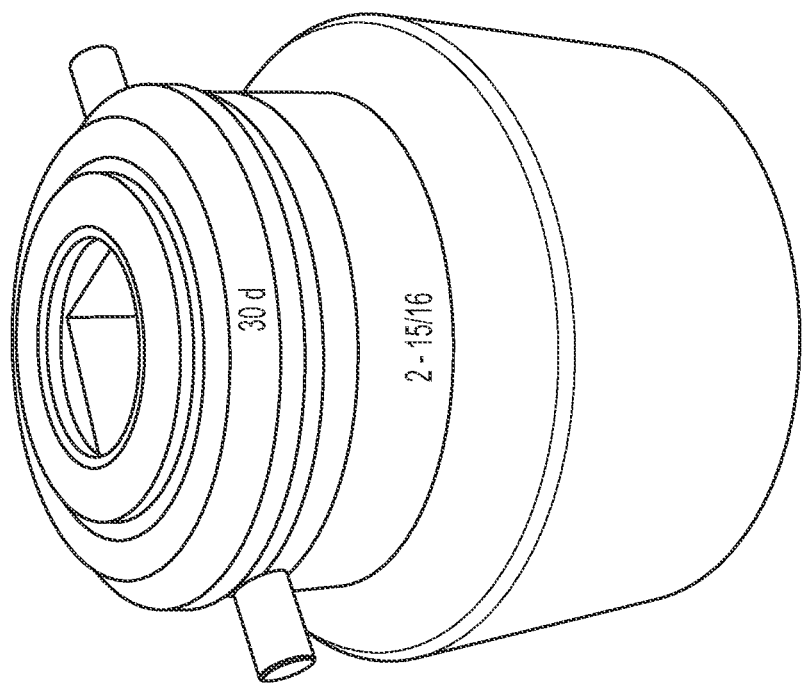
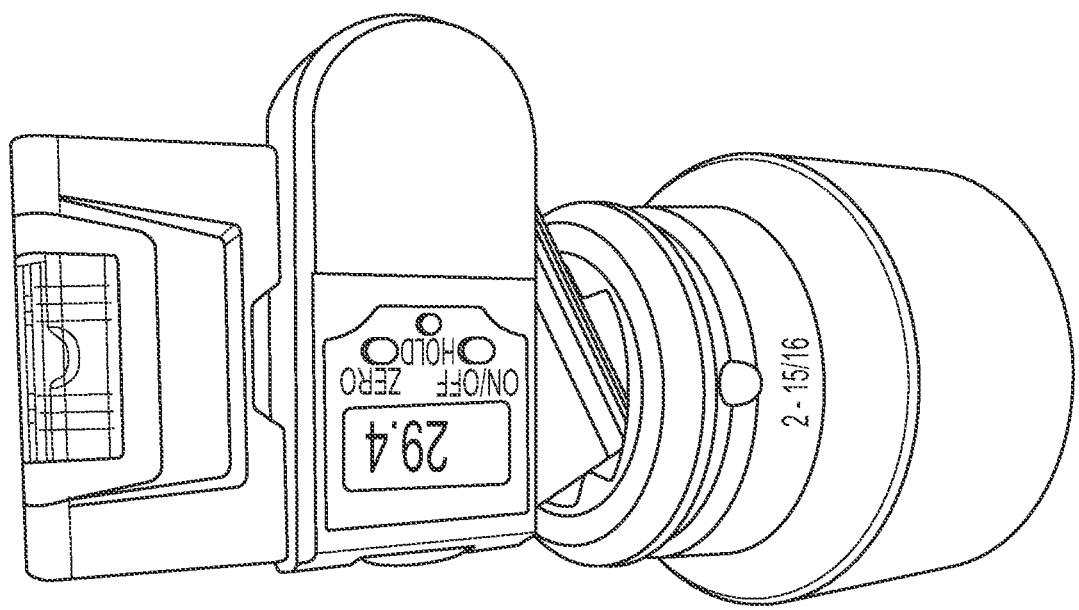
FIG. 34

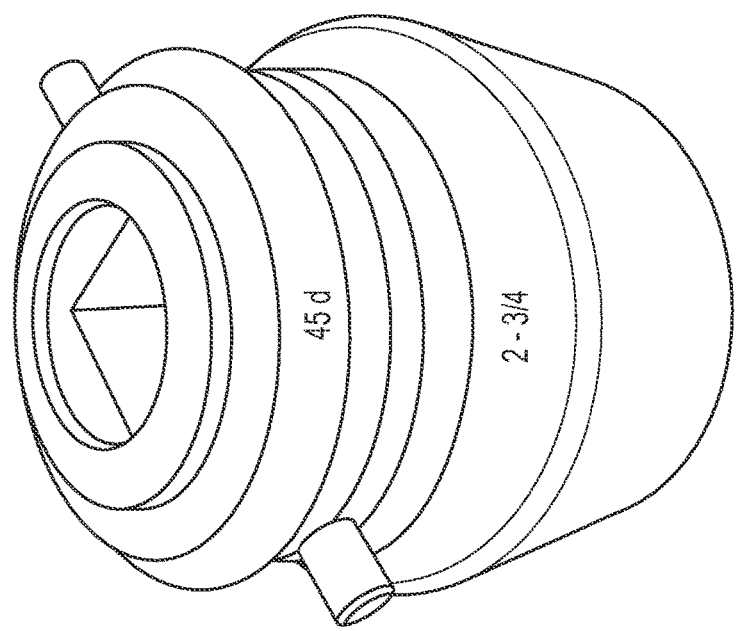
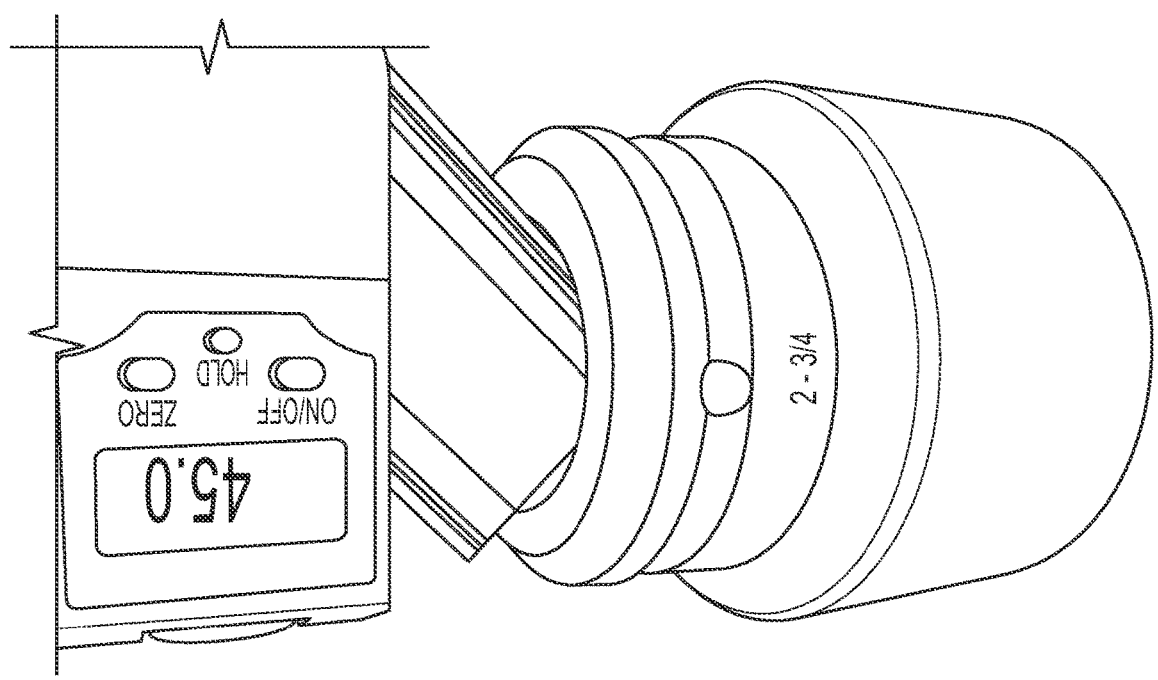
FIG. 35

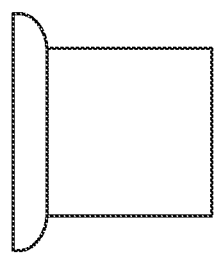
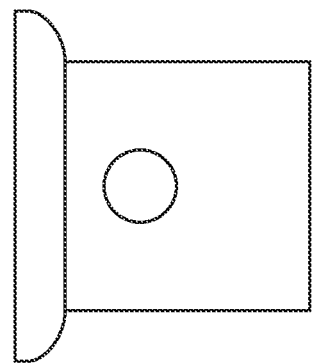
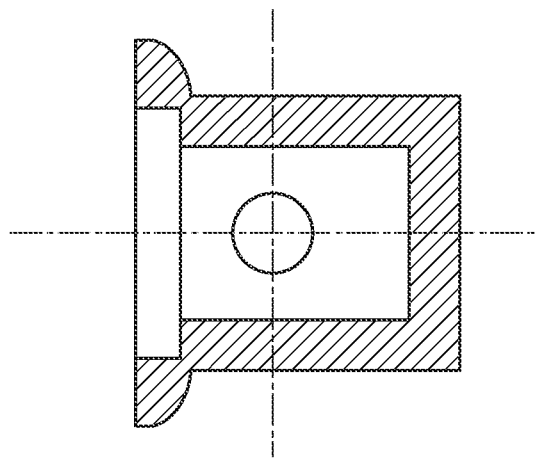
FIG. 36

SOCKET ADAPTOR

CROSS-REFERENCE TO RELATED APPLICATION

This application claims the benefit of and priority to U.S. Provisional Patent Application No. 63/107,631 filed Oct. 30, 2020. The entire disclosure of the above provisional application is incorporated herein by reference.

FIELD

The present disclosure generally relates to socket adaptors configured for retaining impact sockets to impact tools.

BACKGROUND

This section provides background information related to the present disclosure which is not necessarily prior art.

FIG. 1 shows a conventional impact socket adaptor 1 on an anvil 5 of an impact tool 9. The conventional impact socket adaptor 1 includes a tool connection portion 13 having a first set of aligned side holes 17, and a socket connector portion 21 having a second set of aligned side holes 25 defining a passageway through the socket connector portion 21.

As shown in FIG. 1, the first set of aligned holes 17 of the adaptor 1 are aligned with corresponding holes 7 in the impact tool's anvil 5 for receiving a first keeper or retainer therethrough. The first keeper would be inserted through the aligned holes for retaining the adaptor 1 to the impact tool's anvil 5.

The second set of holes 25 of the adaptor 1 are configured to align with side holes in an impact socket when the impact socket is positioned on the socket connector portion 21 of the adaptor 1 for receiving a second keeper or retainer. The second keeper would be inserted through the aligned holes for retaining the socket to the adaptor 1.

FIG. 2 shows a conventional locking pin and retaining O-ring set 29 that may be used with the conventional adaptor 1 shown in FIG. 1. To retain the adaptor 1 to the anvil 5 of the impact tool 9, the locking pin 33 of a first locking pin and retaining O-ring set 29 would be inserted entirely through the aligned holes of the adaptor 1 and impact tool 9. To retain the adaptor 1 to a socket, a locking pin 33 of a second locking pin and retaining O-ring set 29 would be inserted entirely through the aligned holes of the adaptor 1 and the socket.

FIG. 3 shows a conventional socket adaptor 37 that relies upon magnets 41 for retaining an impact socket on the adaptor 37. As shown in FIG. 3, magnets have fallen out of the empty recess 45 and/or are falling apart, which is likely due to impact vibrations generated during use of the impact tool. As recognized by the inventor hereof, this failure of the magnets may allow the impact socket to dislodge and fall off the adaptor 37. The falling impact socket may causes catastrophic injury, death, and/or damage especially when falling from significant heights.

DRAWINGS

The drawings described herein are for illustrative purposes only of selected embodiments and not all possible implementations, and are not intended to limit the scope of the present disclosure.

FIG. 2 shows a conventional locking pin and retaining O-ring set that may be used with the conventional adaptor shown in FIG. 1.

FIG. 3 shows a conventional socket adaptor that relies upon magnets for retaining an impact socket on the adaptor.

FIG. 4 also shows the conventional impact socket adaptor (FIG. 1) and a conventional keeper that may be used, for example, with either socket adaptor.

FIG. 13 shows the socket adaptor shown in FIGS. 5 through 12 positioned on an anvil of an impact tool.

FIG. 14 shows the socket adaptor shown in FIGS. 5 through 12 positioned on an anvil of an impact tool. FIG. 14 also shows the pin of the conventional keeper (FIG. 4) inserted through a side hole of the socket adaptor and corresponding aligned side hole in the anvil of the impact tool after the anvil has been positioned within a receptacle of the socket adaptor.

FIG. 17 show the socket adaptor shown in FIGS. 5 through 12 and conventional keeper (FIG. 4) being used to retain a 3-3/4 inch impact socket to an anvil of an impact tool.

FIG. 18 is an exploded perspective view showing an exemplary embodiment of a socket adaptor aligned for positioning on an anvil of an impact tool and for positioning within a drive socket receptacle of an impact socket.

FIG. 19 is a cross-sectional side view of the socket adaptor positioned within the drive socket receptacle of the impact socket shown in FIG. 18.

FIG. 20 is a cross-sectional side view of the socket adaptor shown in FIG. 18.

FIGS. 21 and 22 are side and bottom views, respectively, of the socket adaptor shown in FIG. 18 with exemplary dimensions (in inches) according to an exemplary embodiment. The dimensions are provided for purpose of illustration only as other exemplary embodiments may be configured differently, e.g., with smaller or larger dimension(s), etc.

Figure 23:
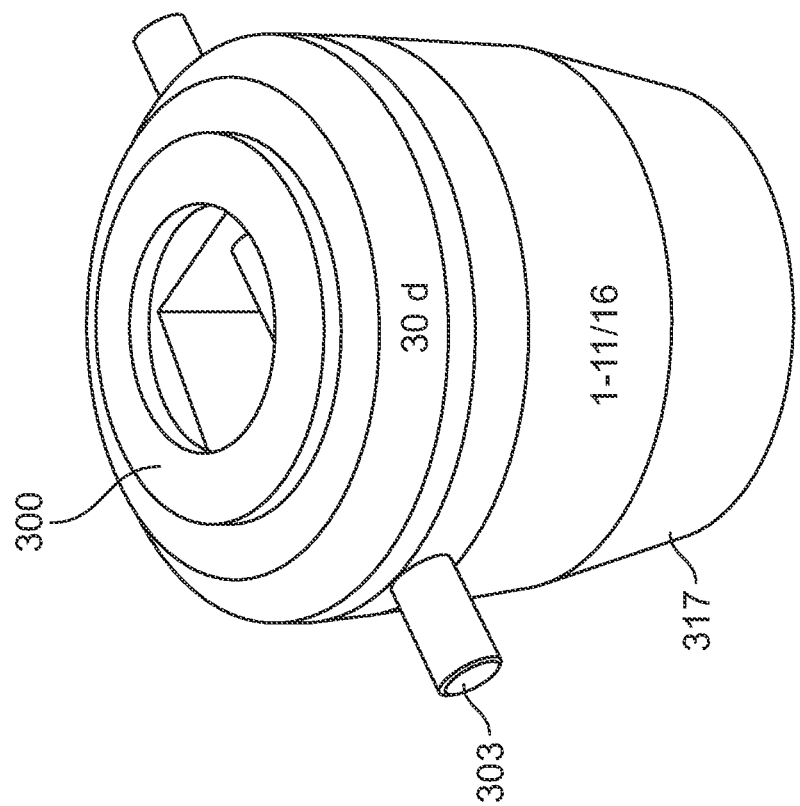

FIG. 23 shows an exemplary embodiment of a socket adaptor positioned within a drive socket receptacle of a 1-11/16 inch impact socket. FIG. 23 also shows a keeper (e.g., a cylindrical metal pin, etc.) inserted through the side holes of the impact socket that are aligned with side holes of socket adaptor after the socket adaptor was positioned within the drive socket receptacle of the impact socket.

Figure 25:
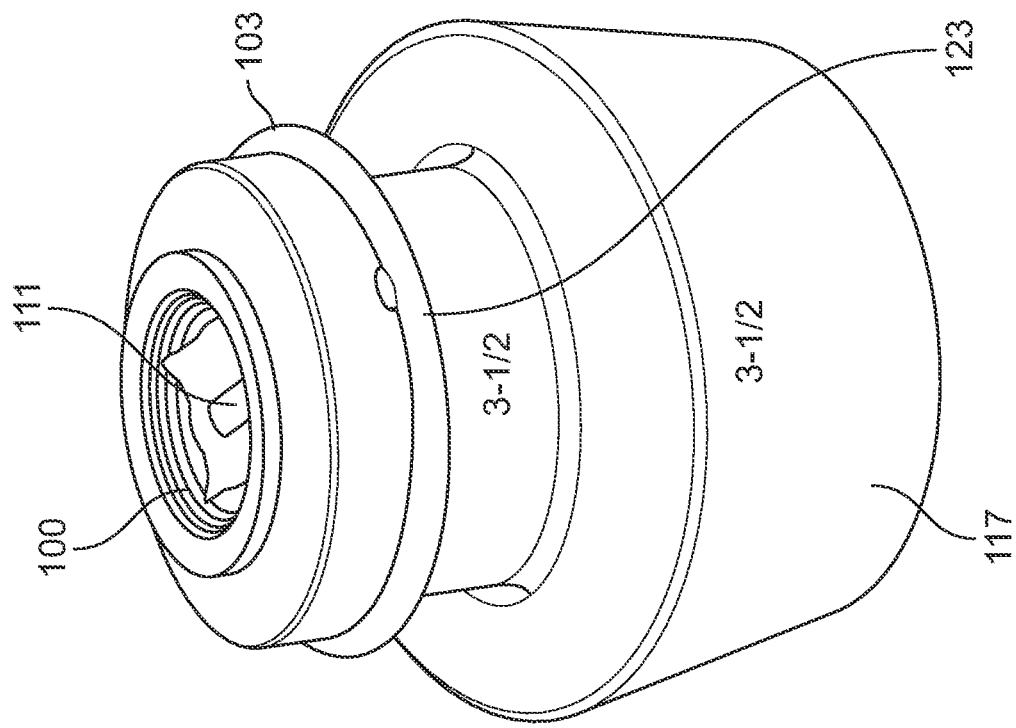
Figure 24:
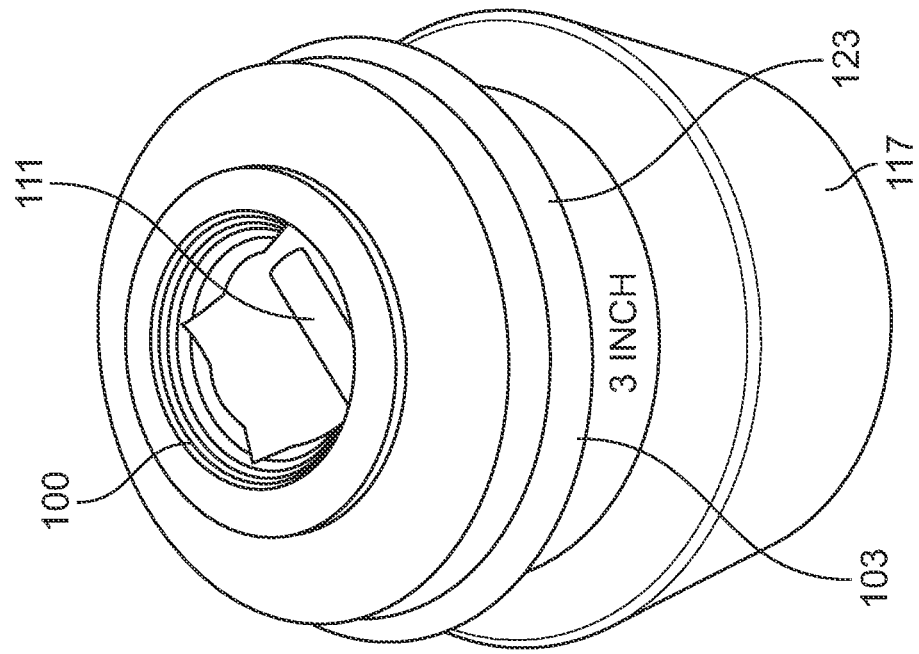

FIGS. 24 and 25 show the socket adaptor shown in FIGS. 5 through 12 positioned within the drive socket receptacle of a 3 inch impact socket and a 3-1/2 inch impact socket.

Figure 27:
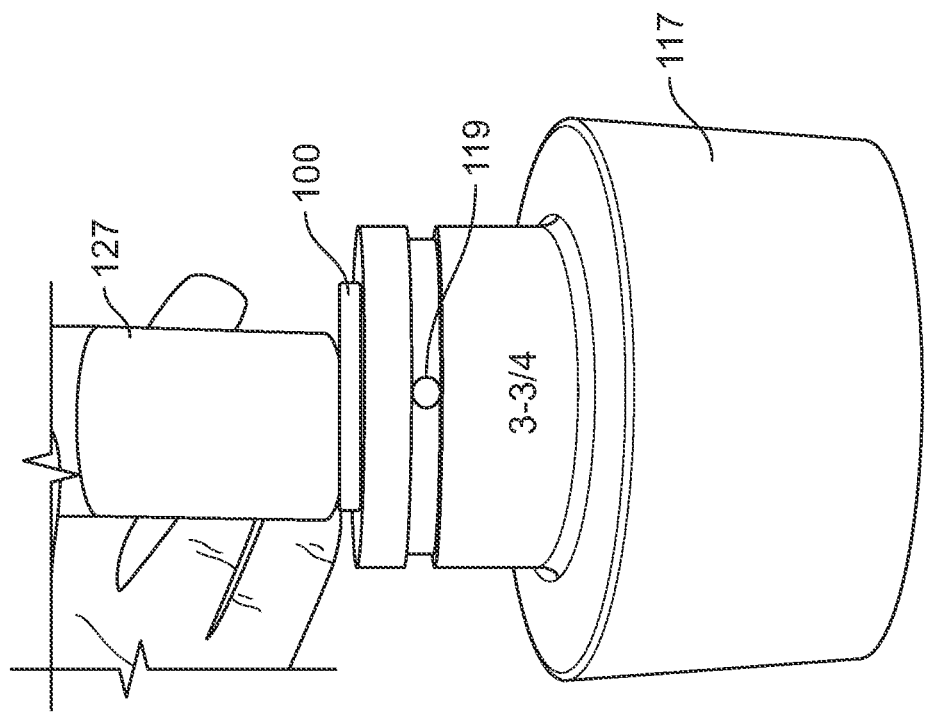
Figure 26:
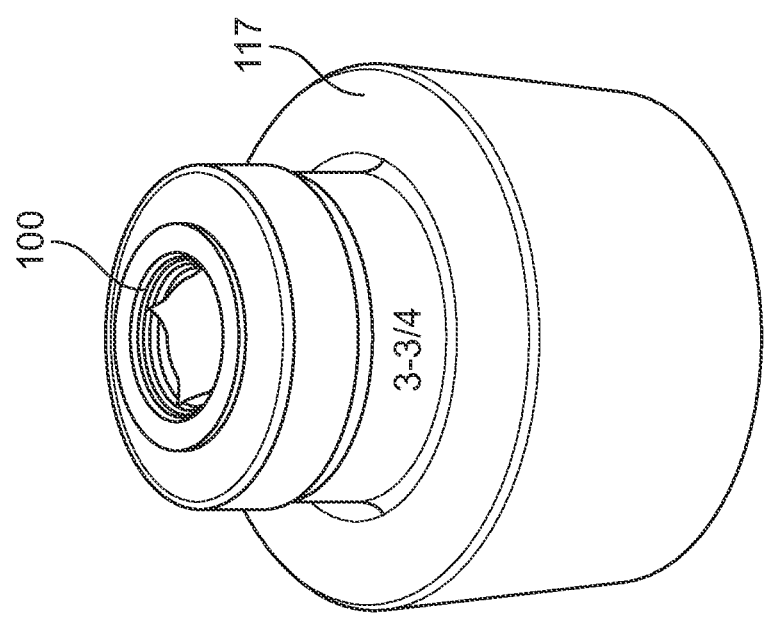

FIGS. 26 and 27 show the socket adaptor shown in FIGS. 5 through 12 positioned within a drive socket receptacle of a 3-3/4 inch impact socket.

Figure 28:
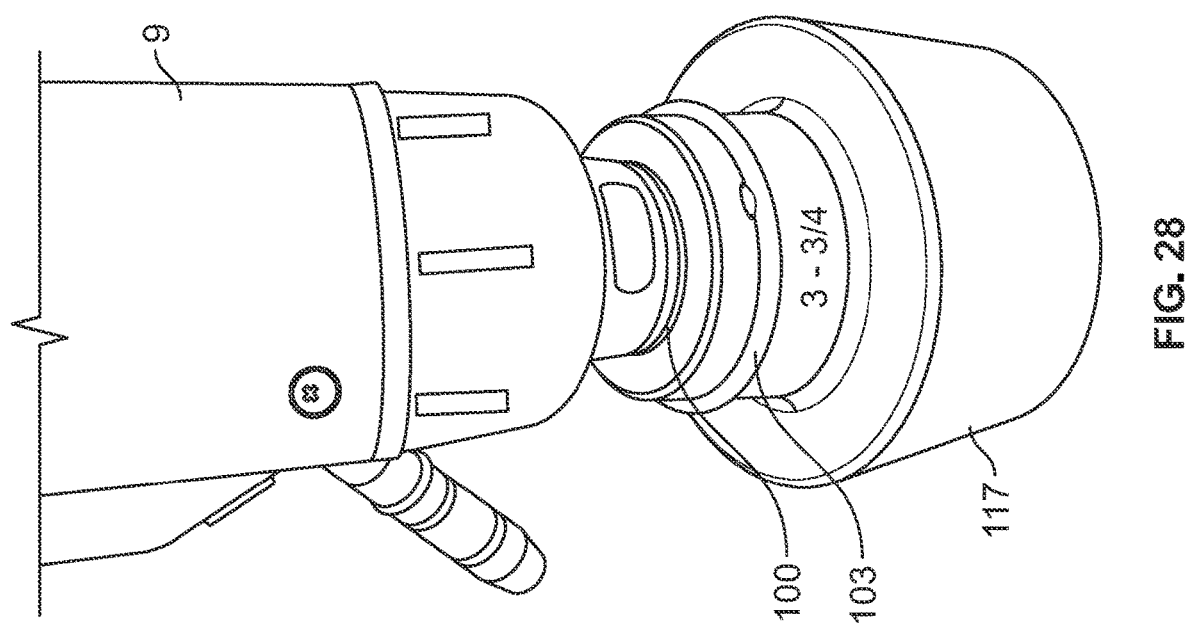

FIG. 28 shows the socket adaptor shown in FIGS. 5 through 12 and conventional keeper (FIG. 4) being used to retain a 3-3/4 inch impact socket to the anvil of an impact tool.

Figure 29:
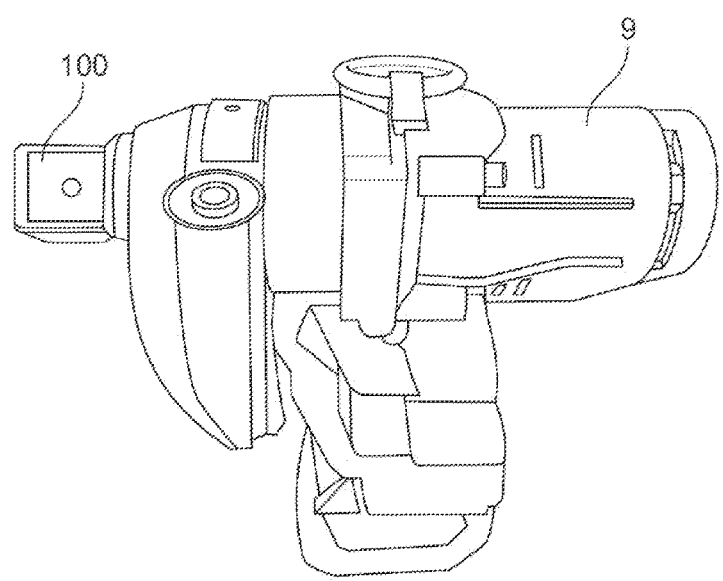

FIG. 29 shows the socket adaptor shown in FIGS. 5 through 12 positioned on the anvil of an impact tool.

Figure 30:
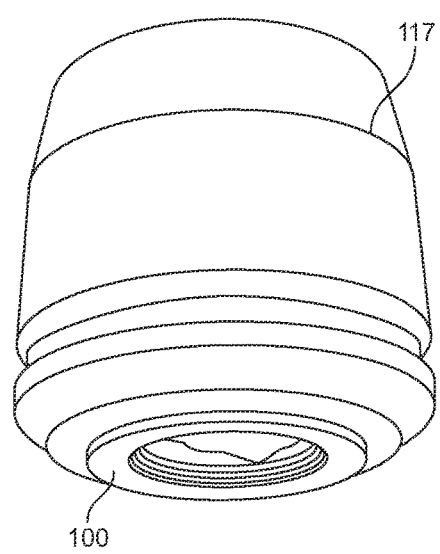

FIG. 30 shows the socket adaptor shown in FIGS. 5 through 12 positioned within a drive socket receptacle of an impact socket.

Figure 32:
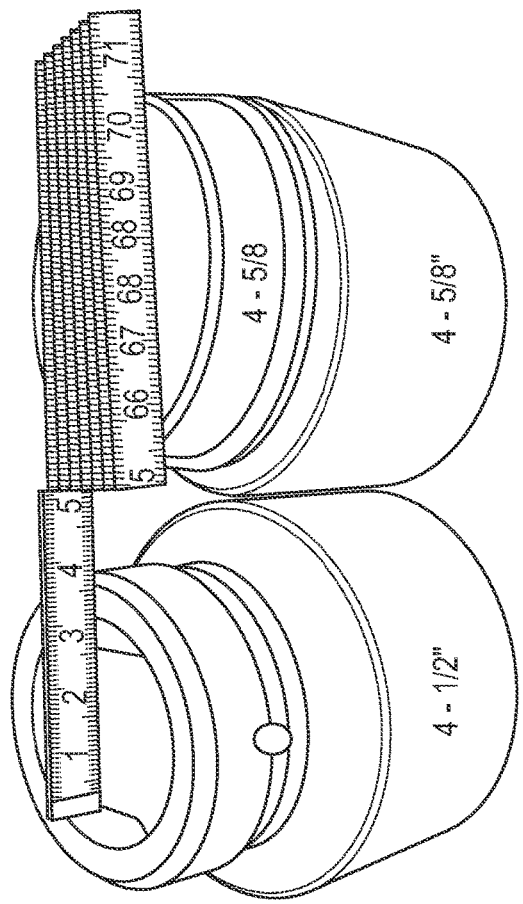

FIGS. 31 and 32 show impact sockets of different sizes that may be used with the socket adaptor shown in FIGS. 5 through 12.

Figure 33:
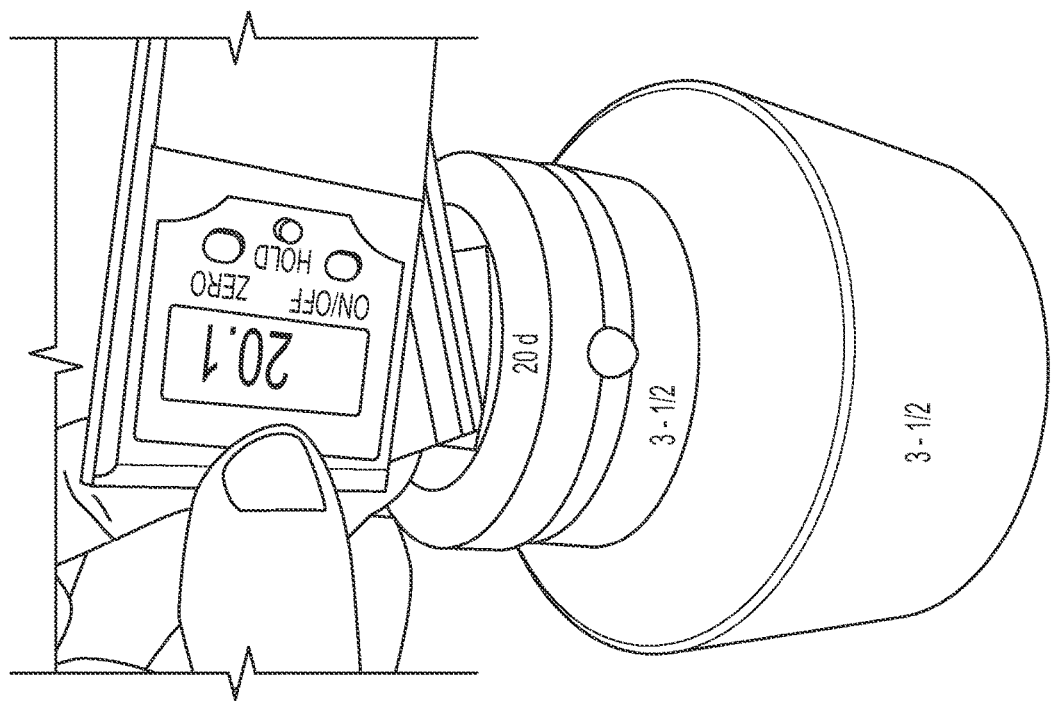

FIG. 33 shows an exemplary embodiment of a socket adaptor that may be configured to be positioned within a drive socket receptacle of a 3 ½ inch impact socket defining a 20 degree angle into the socket's receptacle.

FIG. 34 shows an exemplary embodiment of a socket adaptor that may be configured to be positioned within a drive socket receptacle of a 2 15/16 inch impact socket defining a 30 degree angle into the socket's receptacle.

FIG. 35 shows an exemplary embodiment of a socket adaptor that may be configured to be positioned within a drive socket receptacle of a 2 ¾ inch impact socket defining a 45 degree angle into the socket's receptacle.

FIG. 36 shows an exemplary embodiment that may include three socket adaptors specifically a ¾ inch to 1 inch socket adaptor, a 1 inch to 1 ½ inch socket adaptor, and a 1 ½ inches to 2 ½ inch socket adaptor.

Corresponding reference numbers may indicate corresponding (but not necessarily identical) parts throughout the several views of the drawings.

DETAILED DESCRIPTION

Example embodiments will now be described more fully with reference to the accompanying drawings.

As explained above, FIG. 3 shows a conventional socket adaptor 37 that relies upon magnets 41 for retaining an impact socket on the adaptor 37. But as also shown in FIG. 3, magnets may fall out and/or break apart during use of the impact tool. As recognized by the inventor hereof, this failure of the magnets may allow the impact socket to dislodge and fall off the adaptor 37. The falling impact socket may causes catastrophic injury, death, and/or damage especially when falling from significant heights.

After recognizing the above, the inventor hereof developed and discloses herein exemplary embodiments of socket adaptors that may be used (e.g., universally, etc.) for retaining differently configured sockets (e.g., impact sockets of different sizes, etc.) to impact tools (e.g., impact wrenches, air hammers, air impact tools, pneumatic air tools, cordless impact tools with rechargeable batters, etc.). As disclosed herein, exemplary embodiments are disclosed of socket adaptors that provide a reliable and safe alternative to conventional socket adaptors (e.g., adaptor 37 in FIG. 3, etc.). For example, an exemplary embodiment of a socket adaptor disclosed herein may provide a robust interconnection between the socket adaptor, impact socket, and anvil of the impact tool such that even if the socket adaptor is damaged during use of the impact tool, the impact socket would be retained on the adaptor and the adaptor would be retained on the anvil of the impact tool, thereby preventing the impact socket from falling off the anvil.

Figure 1:
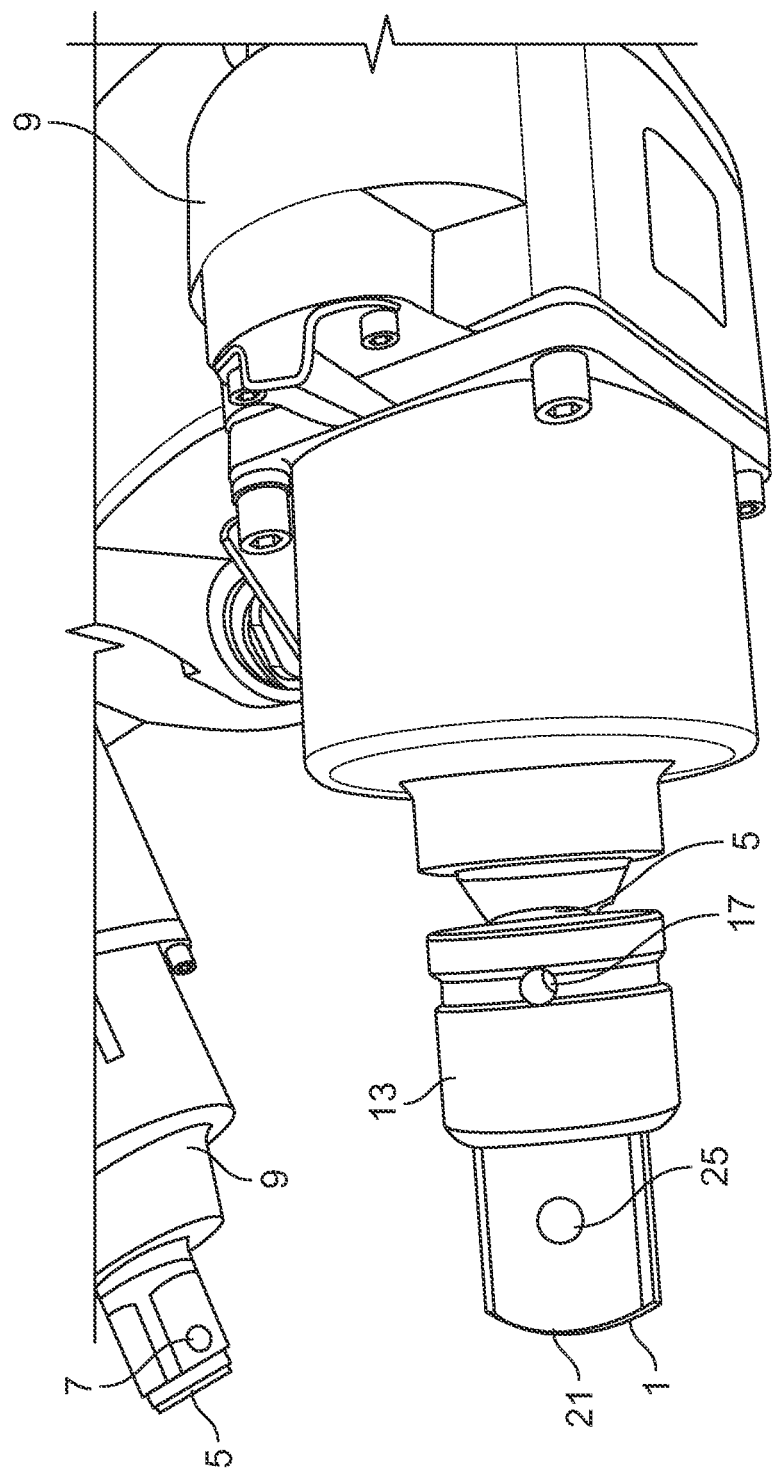
FIG. 1 shows a conventional impact socket adaptor on an anvil of an impact tool.
Figure 4:
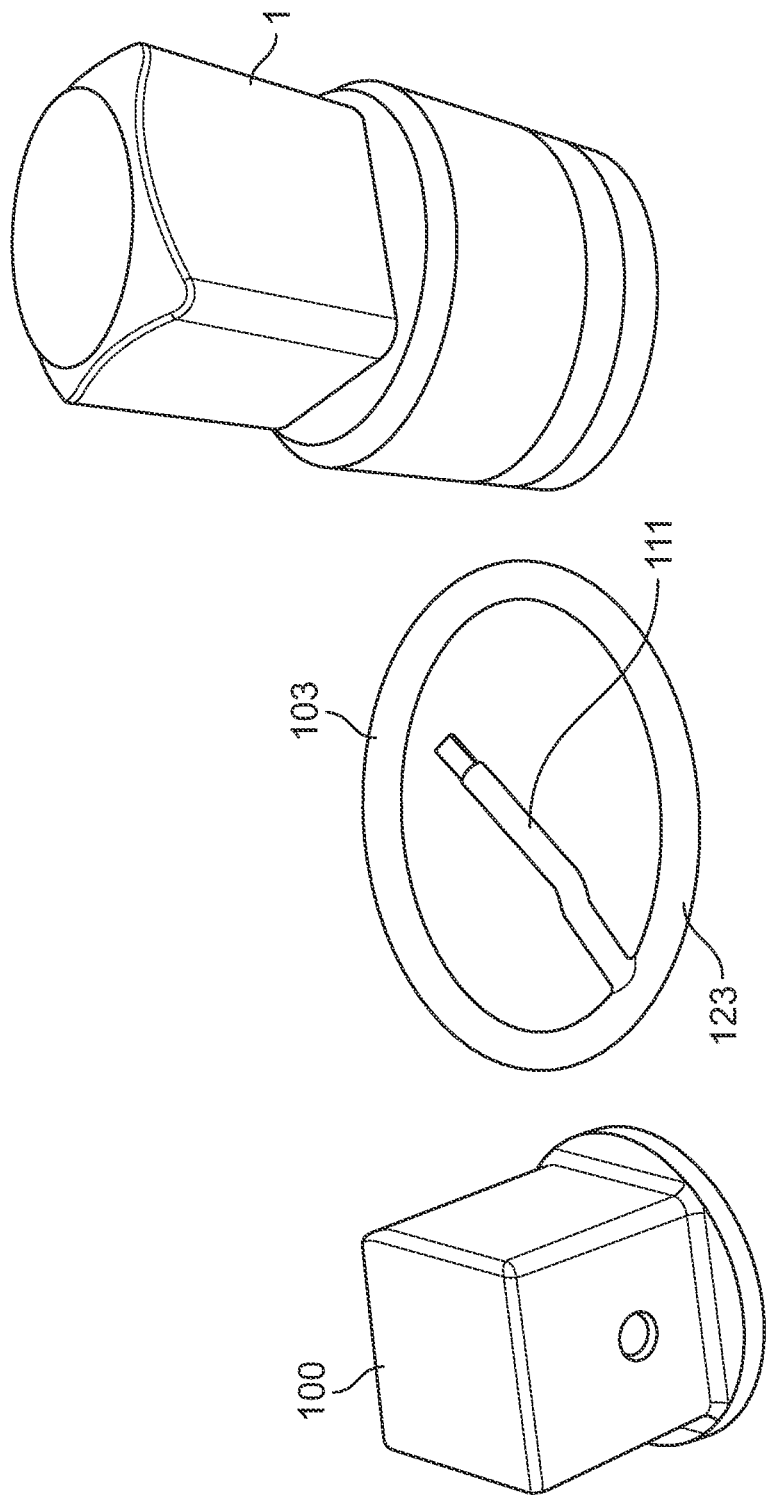
FIG. 4 through 12 show a socket adaptor according to an exemplary embodiment of the present disclosure.

FIG. 4 shows an exemplary embodiment of a socket adaptor 100 embodying one or more aspects of the present disclosure. FIG. 4 also shows the conventional impact socket adaptor 1 (FIG. 1) along with a conventional keeper 103 (e.g., a molded elastomeric retaining ring and pin, etc.) that may be used, for example, with either the socket 100 or the conventional socket adaptor 1. FIG. 4 shows but one example keeper 103 that may be used with the socket adaptor 100. Other keepers may be used with the socket adaptor 100, such as a socket retaining ring disclosed in U.S. Pat. Nos. 4,266,453, 4,583,430, and/or 7,363,840, which are incorporated herein by reference. FIG. 25 also shows another keeper 303 comprising a cylindrical metal pin that that may be used with a socket adaptor as disclosed herein.

Figure 6:
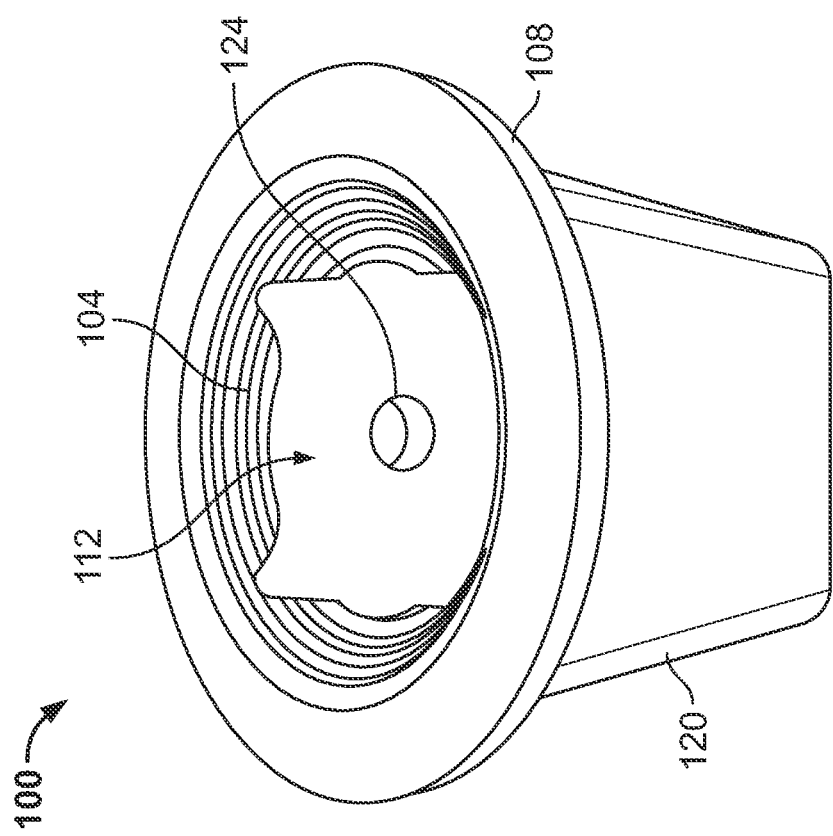
Figure 5:
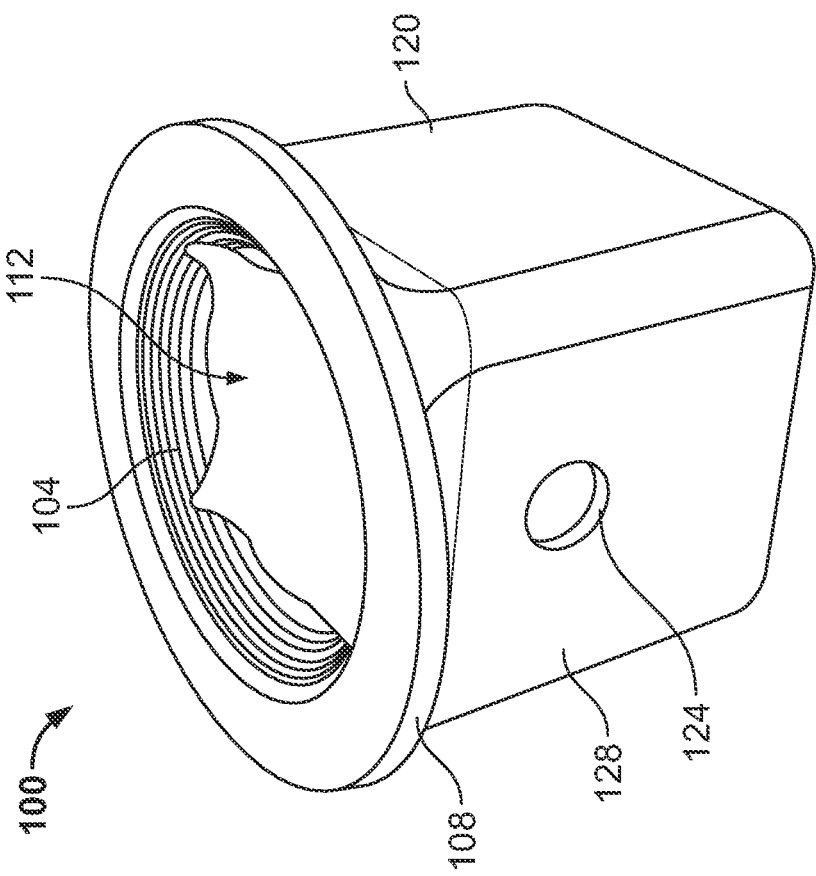
Figure 8:
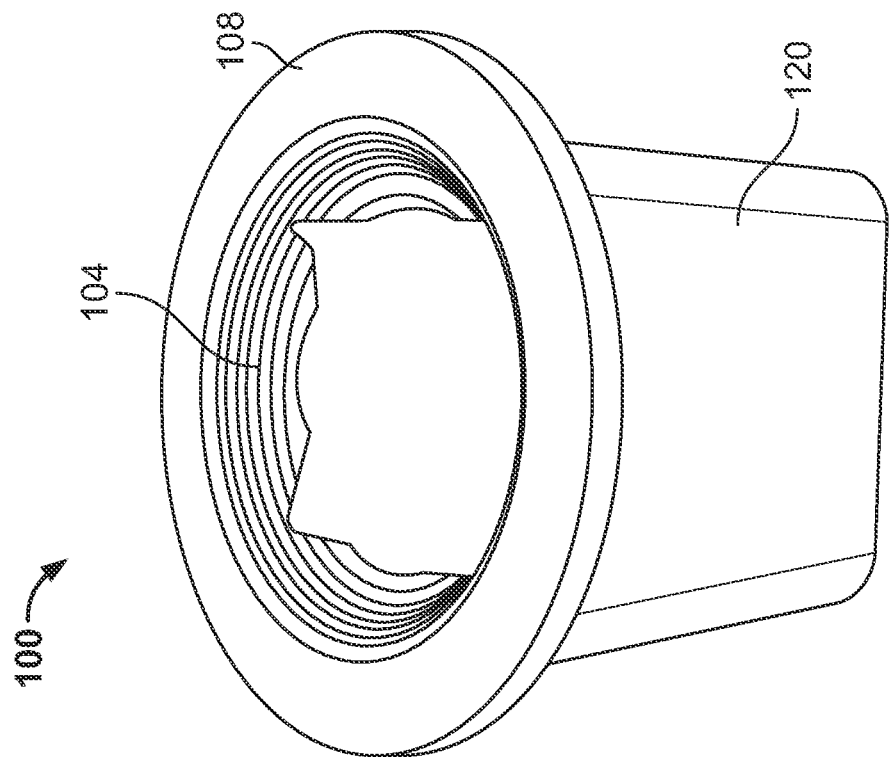

FIGS. 5, 6, and 8 generally show the tapered, chamfered, and/or angled inner surfaces 104 of the socket adapter 100 that define an inner transition or lead-in (e.g., gradually tapering or decreasing transition opening, without a stepped collar or other portion defining a weak breaking point, etc.) from the adaptor's flange or shoulder 108 into the socket adaptor's receptacle 112. The inner transition may be configured to facilitate insertion of an anvil 5 of an impact tool 9 (broadly, a tool) into the adaptor's receptacle 112.

Figure 7:
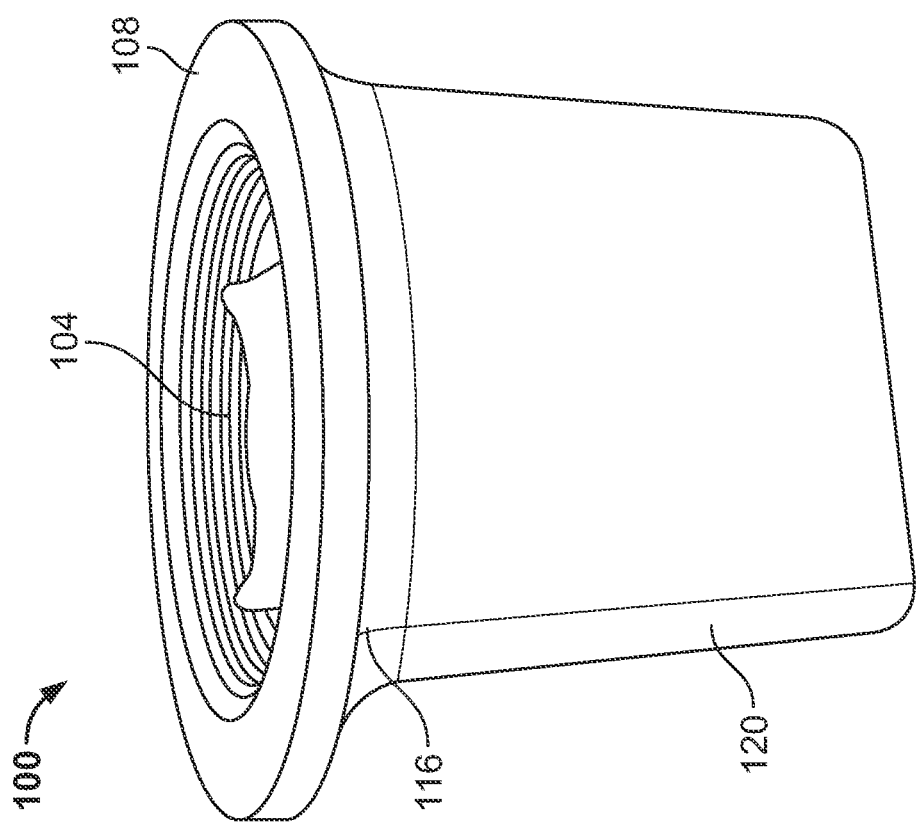

FIG. 7 generally shows the tapered, chamfered, and/or angled outer surfaces 116 that define an outer transition or lead-in (e.g., gradually tapering or decreasing transition, without a stepped collar or other portion defining a weak breaking point, etc.) from the adaptor's flange or shoulder 108 to the body 120 of the adaptor 100. The outer transition may be configured to facilitate insertion of the adaptor's body 120 into a drive socket receptacle of an impact socket (broadly, a socket).

The inner and outer transitions defined respectively by the surfaces 104, 116 may be configured to have substantially matching radii of curvatures and/or define substantially similar angles. The inner and/or outer transitions may define acute angles relative to the adaptor body 120 within a range from about 20 degrees to about 45 degrees, etc. For example, exemplary embodiments may include socket adaptors configured for use with sockets defining a 20 degree angle (e.g., FIG. 33), a 30 degree angle (e.g., FIG. 34), a 45 degree angle (e.g., FIG. 35), etc. into the socket adaptor's receptacle.

As shown in FIGS. 5 and 6, the socket adaptor 100 includes a single side hole 124 defined through only one of the four sidewalls 128 of the adaptor body 120. As shown by FIG. 14, the side hole 124 of the socket adaptor 100 is alignable with a hole 7 (FIG. 1) in the anvil 5 of the impact tool 9. The pin 111 of the keeper 103 (or other keeper) may be inserted through the side hole 124 of the socket adaptor 100 and the corresponding aligned hole 7 of the impact tool's anvil 5 as shown in FIG. 14. In alternative embodiments (e.g., FIG. 21. FIG. 25, etc.), the socket adaptor includes two aligned holes defined through opposite sidewalls. See, for example, the socket adaptor 200 including aligned holes 224 as shown in FIG. 21 and described below.

Figure 15:
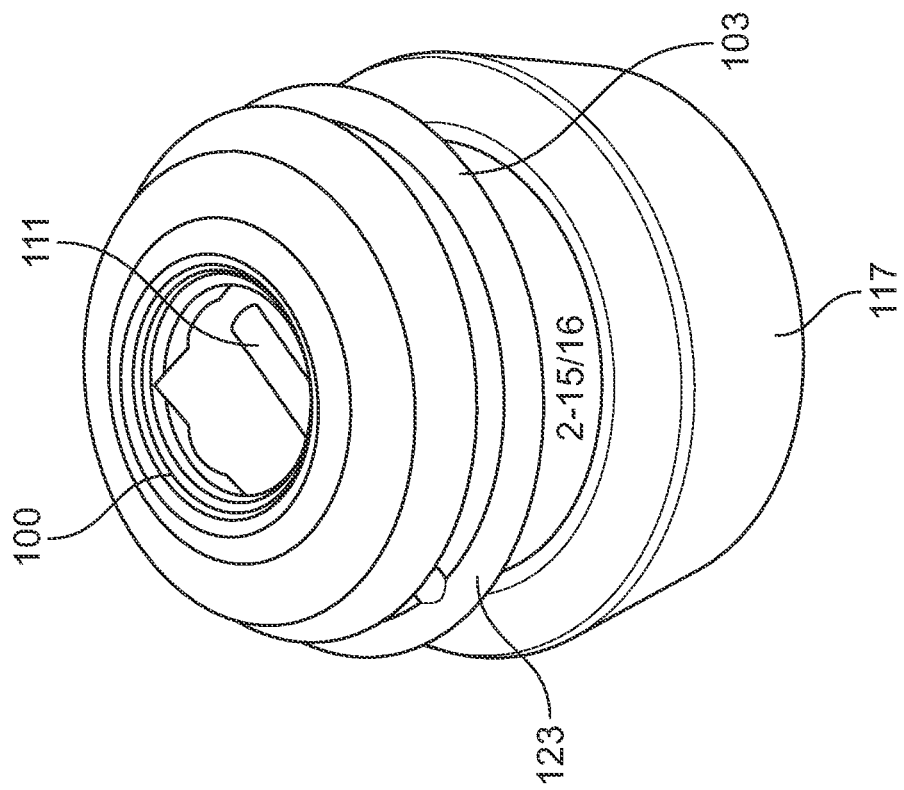
FIG. 15 shows the socket adaptor shown in FIGS. 5 through 12 positioned within the drive socket receptacle of a 2-15/16 inch impact socket.

The side hole 124 of the socket adaptor 100 is alignable with a side hole 119 of an impact socket 117. The pin 111 of the keeper 103 (or other keeper) may be inserted through the side hole 124 of the socket adaptor 100 and the corresponding aligned hole 119 of the impact socket 117 as shown in FIG. 15.

Figure 16:
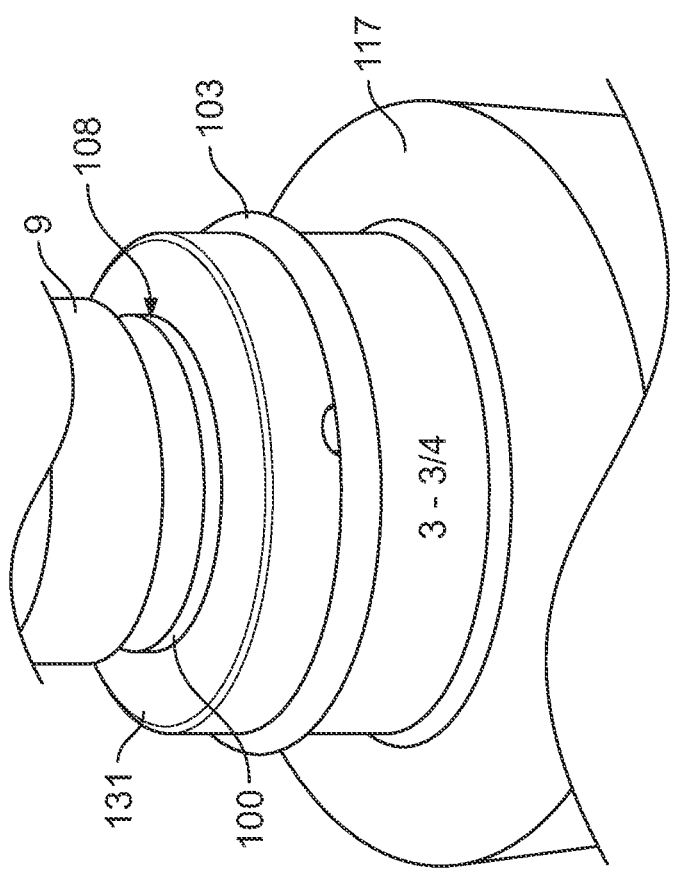
FIG. 16 shows the socket adaptor shown in FIGS. 5 through 12 and conventional keeper (FIG. 4) being used to retain a 3-3/4 inch impact socket to an anvil of an impact tool.

Accordingly, the pin 111 of the single keeper 103 (or other keeper) may be inserted through aligned holes 119, 124, and 7. More specifically, the single keeper's pin 111 may first be inserted through the side hole 119 (FIG. 27) of the impact socket 117, then through the aligned side hole 124 of the socket adaptor 100, and finally through the aligned hole 7 in the anvil 5 of the impact tool 9. At which point, the impact socket 117 is retained to the impact tool 9 via the socket adaptor 100 and the keeper 103 (or other keeper) as shown in FIGS. 16 and 17.

Figure 10:
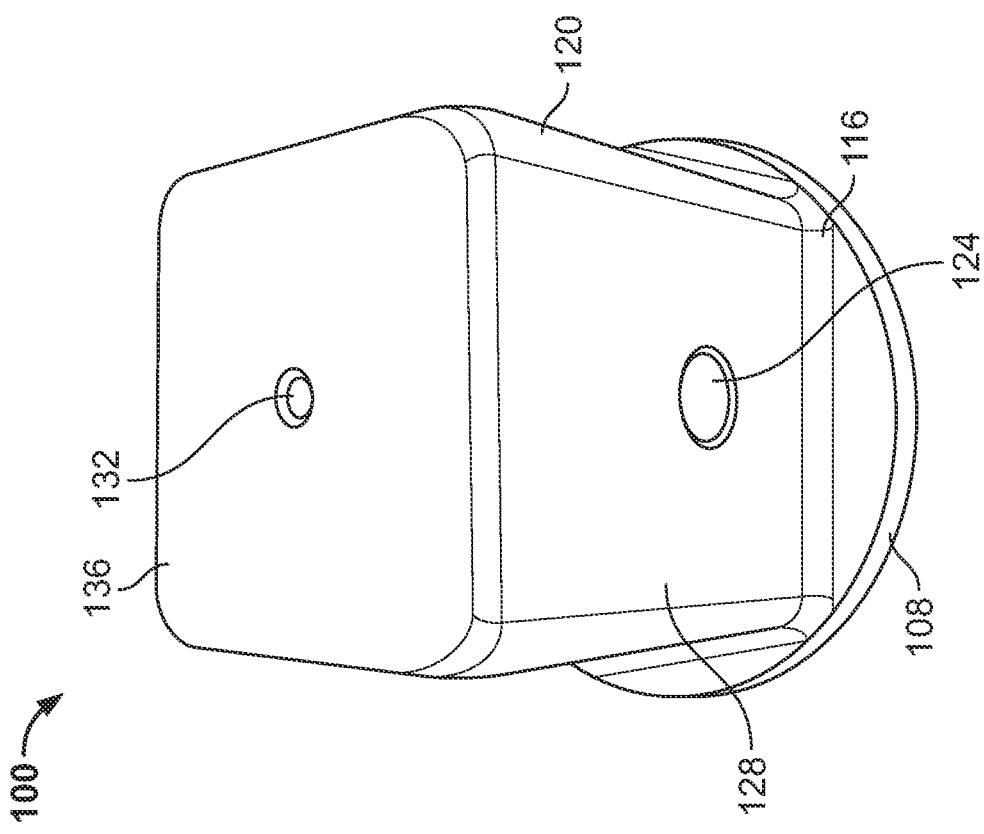
Figure 9:
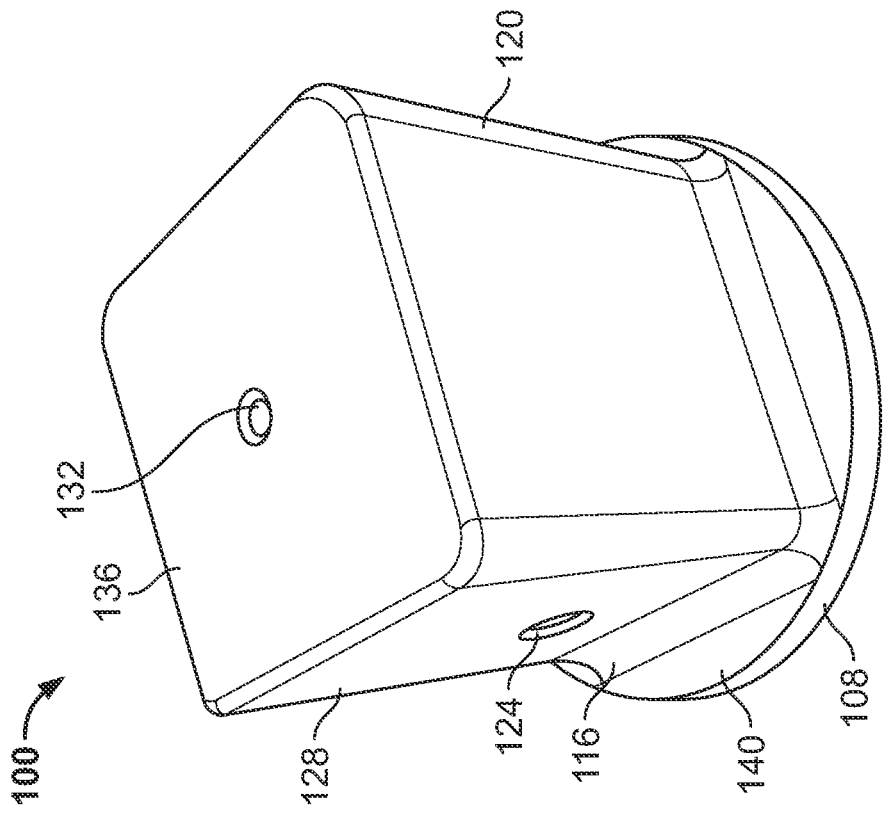
Figure 12:
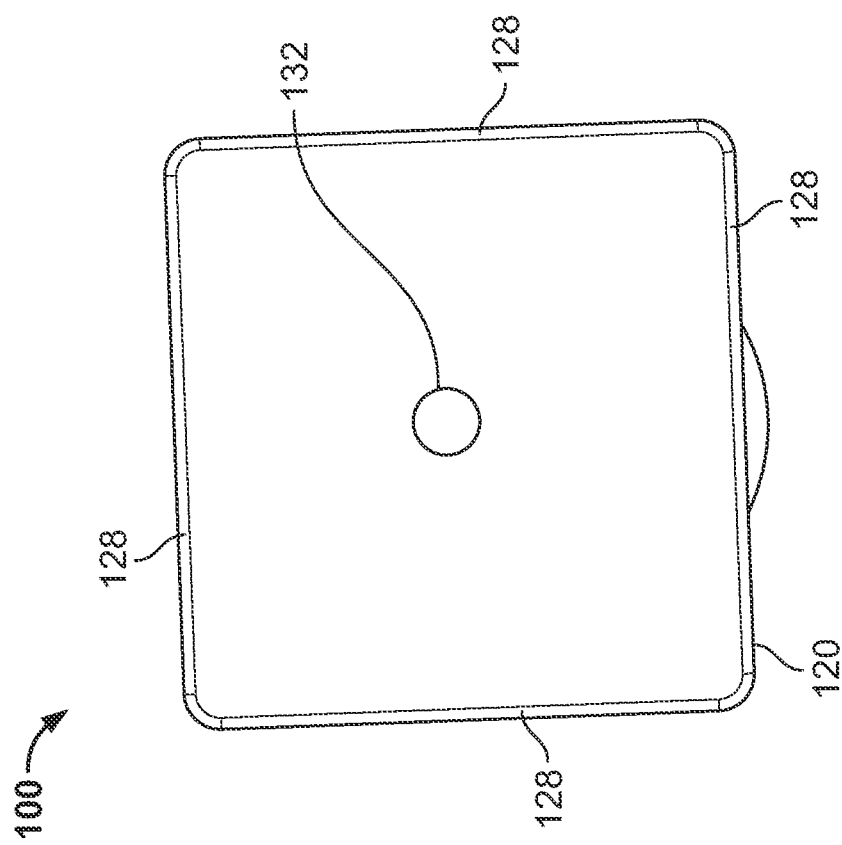
Figure 11:
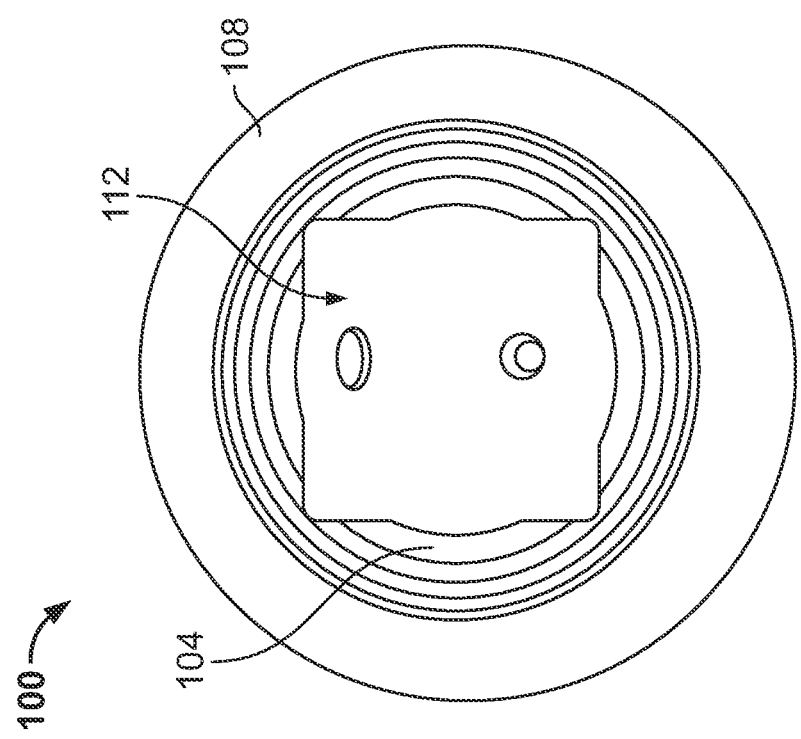

FIGS. 9 and 10 show a hole 132 in the bottom 136 of the socket adaptor 100. The hole 132 may be configured to facilitate insertion of an anvil of an impact tool into the adaptor's receptacle 112 and/or to facilitate insertion of the body 120 of the socket adaptor 100 into a drive socket receptacle of an impact tool.

The receptacle 112 of the socket adaptor 100 is configured (e.g., shaped, dimensionally sized, etc.) to receive an anvil of an impact tool. For example, FIG. 11 generally shows an example rectangular (e.g., square, etc.) shape of the receptacle 112 defined by the inner surfaces of the four sidewalls 128 of the socket adaptor 100. The adaptor's receptacle 112 is thus configured to receive a corresponding rectangular shaped anvil of an impact tool as shown in FIG. 13, etc.

The body 120 of the socket adaptor 100 is configured (e.g., shaped, dimensionally sized, etc.) to be received within a drive socket receptacle of an impact socket. For example, FIG. 12 generally shows an example rectangular (e.g., square, etc.) shape of the body 120 defined by the outer surfaces of the four sidewalls 128 of the socket adaptor 100. The adaptor's body 120 is thus configured to be received within a corresponding rectangular shaped drive socket receptacle of an impact socket.

FIGS. 15 and 16 show the socket adaptor 100 positioned within a drive socket receptacle of two different sized impact sockets 117, specifically, $2^{15}/_{16}$ inch impact socket (FIG. 15) and a $3\frac{3}{4}$ inch impact socket (FIG. 16). The socket adaptor 100 may also be positioned within the drive socket receptacle of other different sized impact sockets, such as a 3 inch impact socket, $3\frac{1}{2}$ inch impact socket, etc.

FIG. 15 shows the ring 123 of the keeper 103 (FIG. 4) disposed around the socket head of the impact socket 117, and the pin 111 of the keeper 103 inserted through the aligned adaptor side hole 124 and socket side hole 119 located above the stepped collar of the impact socket 117.

FIG. 16 shows the socket adaptor 100 and keeper 103 being used to retain the $3\frac{3}{4}$ inch impact socket 117 to the anvil of the impact tool 9. The socket adaptor 100 is configured to have a relatively thin flange or shoulder 108. The socket adaptor 100 is configured such that when the adaptor's body 120 is inserted into the drive socket receptacle of the impact socket 117, the surface 140 of the flange or shoulder 108 will contact, bottom out, and/or abut against the surface 131 of the impact socket 117 at about the same time (e.g., substantially simultaneously, etc.) as when the bottom 136 of the socket adaptor 100 contacts, bottoms out, and/or abuts against a bottom surface within the drive socket receptacle of the impact socket 117. Accordingly, the socket adaptor's flange or shoulder 108 and bottom 136 are configured to make substantial simultaneous contact with corresponding portions of the impact socket 117. And, as shown in FIG. 16, the socket adaptor 100 does not take up or require any additional space when the socket adaptor 100 is used to retain an impact socket to an impact tool, which is advantageous when space is very limited at the location where the impact tool will be used.

FIGS. 18-22 shows an exemplary embodiment of a socket adaptor 200 embodying one or more aspects of the present disclosure. As shown in FIG. 18, the socket adaptor 200 is aligned for positioning on an anvil 205 of an impact tool 209 and for positioning within a drive socket receptacle of an impact socket 217. As shown in FIG. 19, the socket adaptor 200 includes two holes 224 that are aligned with the side holes 219 of the impact socket 217.

Features of the socket adaptor 200 may be essentially identical to corresponding features of the socket adaptor 100 shown in FIGS. 5-12 and described above. Accordingly, a detailed description of each feature of the socket adaptor 200 will not be repeated for brevity.

Also, FIGS. 21 and 22 provide exemplary dimensions (in inches) for purpose of illustration only as other exemplary embodiments may be configured differently, e.g., with smaller or larger dimension(s), etc. For example, as shown in FIG. 22, inside corners of the socket adaptor's receptacle 212 may be configured to have a radius of about 0.05 inches (0.050R), and outside corners of the socket adaptor's body 220 may be configured to have a radius of about 0.15 inches (0.150R).

As shown in FIG. 21, the tapered, chamfered, and/or angled outer surfaces 216 of the socket adaptor 200 may be configured to have a radius of about 0.4 inches (0.400R). The tapered, chamfered, and/or angled outer surfaces 216 of the socket adaptor 200 may define an outer transition or lead-in (e.g., gradually tapering or decreasing transition, without a stepped collar or other portion etc.) from the adaptor's flange or shoulder 208 to the body 220 of the adaptor 200. The outer transition may be configured to facilitate insertion of the adaptor's body 220 into a drive socket receptacle of an impact socket.

As shown in FIGS. 18-21, the socket adaptor 200 includes radiused or rounded corners instead of sharp square corners. Advantageously, the use of radiused or rounded corners helps to prevent or eliminate weak break points that may otherwise be associated with sharp square corners.

FIG. 23 shows an exemplary embodiment of a socket adaptor 300 positioned within a drive socket receptacle of a $1^{11}/_{16}$ inch impact socket 317. FIG. 23 also shows a keeper 303 (e.g., a cylindrical metal pin, etc.) inserted through the side holes of the impact socket 317 that are aligned with side holes of socket adaptor 300 after the socket adaptor 300 was positioned within the drive socket receptacle of the impact socket 317. Features of the socket adaptor 300 may be essentially identical to corresponding features of the socket adaptor 100 shown in FIGS. 5-12 and described above. Accordingly, a detailed description of each feature of the socket adaptor 300 will not be repeated for brevity.

Although FIG. 23 shows a $1^{11}/_{16}$ inch impact socket 317 with a 30 degree sloped surface into the receptacle along the top of the socket 317, the socket adaptors disclosed herein may be configured differently, e.g., configured for use with impact sockets of different sizes (e.g., $1\frac{1}{2}$ inch drive socket, $2\frac{1}{2}$ inch drive socket, $2\frac{3}{4}$ inch impact socket, $2^{15}/_{16}$ inch impact socket, 3 inch impact socket, $3\frac{1}{2}$ inch impact socket, $3\frac{3}{4}$ inch impact socket, etc.) and/or with impact sockets having different sloped surfaces into the receptacles along the top of the sockets (e.g., 20 degrees (FIGS. 23 and 33), 30 degrees (FIG. 34), 45 degrees (FIG. 35), etc.).

In addition, a socket adaptor disclosed herein may be used (e.g., universally, etc.) with various impact tools and sockets, including impact tools and sockets of different sizes and/or from different companies, Snap-On, Ingersoll Rang, Armstrong, Williams, PROTO, Milwaukee Tool, Chicago Pneumatic, Klutch, Partsmaster, etc.

A socket adaptor disclosed herein (e.g., socket adaptor 100 (FIGS. 4-12), socket adaptor 200 (FIGS. 18-22), socket adaptor 300 (FIG. 23), etc.) may be made from various suitable materials, including stainless steels, metals, alloys, non-metals, etc. By way of example only, a socket adaptor may be made from 440 stainless steel or high-carbon chromium steel. By way of further example only, a socket adaptor may be made from 4140 alloy steel, 4340 alloy steel, 6150 alloy steel, 8740 alloy steel, and/or 8620 alloy steel, etc. 4140 steel is a low alloy steel containing chromium, molybdenum, and manganese, 4340 steel is a heat treatable and low alloy steel containing chromium, nickel and molybdenum. 6150 steel is a fine grained, highly abrasion resistant carbon-chromium alloy steel. 8740 steel is a is a nickel-chromium-molybdenum low-alloy steel. 8620 steel is a low alloy nickel, chromium, molybdenum case hardening steel. In a preferred exemplary embodiment, a socket adaptor (e.g., socket adaptor 100 (FIGS. 4-12), socket adaptor 200

(FIGS. 18-22), socket adaptor 300 (FIG. 23), etc.) is made from a low alloy steel containing chromium, molybdenum, and manganese.

As noted above, this application claims the benefit of and priority to U.S. Provisional Patent Application No. 63/107,631, which is incorporated herein by reference in its entirety including its figures. FIGS. 16, 17, 18, 19, 21, 23, 24, 25, and 26 from the U.S. Provisional Patent Application No. 63/107,631 have been renumbered as FIGS. 24-32, respectively.

FIGS. 24 and 25 show the socket adaptor shown in FIGS. 5 through 12 positioned within the drive socket receptacle of a 3 inch impact socket (FIG. 24) and a 3½ inch impact socket (FIG. 25).

FIGS. 26 and 27 show the socket adaptor shown in FIGS. 5 through 12 positioned within a drive socket receptacle of a 3¾ inch impact socket. FIG. 27 also shows a flashlight 127 shining light into the receptacle 124 of the socket adaptor 100 The light from the flashlight 127 is visible through the side hole 119 of the impact socket 117 that is aligned with the side hole 124 of the socket adaptor 100.

FIG. 28 shows the socket adaptor shown in FIGS. 5 through 12 and conventional keeper (FIG. 4) being used to retain a 3¾ inch impact socket to the anvil of an impact tool.

FIG. 29 shows the socket adaptor shown in FIGS. 5 through 12 positioned on the anvil of an impact tool.

FIG. 30 shows the socket adaptor shown in FIGS. 5 through 12 positioned within a drive socket receptacle of an impact socket.

FIGS. 31 and 32 show impact sockets of different sizes that may be used with the socket adaptor shown in FIGS. 5 through 12.

As shown in FIG. 33, an exemplary embodiment of a socket adaptor may be configured to be positioned within a drive socket receptacle of a 3⅜ inch impact socket defining a 20 degree angle into the socket's receptacle.

As shown in FIG. 34, an exemplary embodiment of a socket adaptor may be configured to be positioned within a drive socket receptacle of a 2¹⁵⁄₁₆ inch impact socket defining a 30 degree angle into the socket receptacle.

As shown in FIG. 35, an exemplary embodiment of a socket adaptor may be configured to be positioned within a drive socket receptacle of a 2¾ inch impact socket defining a 45 degree angle into the socket's receptacle.

FIGS. 33, 34, and 35 show that the same socket adaptor is usable with each of the three different sockets, specifically, a 3½ inch impact socket with a 20 degree angle (FIG. 33), a 2¹⁵⁄₁₆ inch impact socket with a 30 degree angle (FIG. 34), and a 2⅞ inch impact socket with a 45 degree angle (FIG. 35). FIGS. 34 and 35 also each show a keeper (e.g., a cylindrical metal pin, etc.) may be inserted through the side holes of the impact socket that are aligned with side holes of socket adaptor after the socket adaptor is positioned within the drive socket receptacle of the impact socket.

In exemplary embodiments, the socket adaptors disclosed herein may be configured (e.g., shaped and sized dimensionally, etc.) for use with differently sized sockets. For example, the socket adapter may comprise a ¾ inch to 1 inch socket adaptor, 1 inch to 1½ inch socket adaptor, a 1½ inches to 2½ inch socket adaptor, etc. An exemplary embodiment may include a plurality of socket adaptors each configured for use with a different size socket. For example, as shown in FIG. 36, an exemplary embodiment may include three socket adaptors specifically a ¾ inch to 1 inch socket adaptor, a 1 inch to 1½ inch socket adaptor, and a 1½ inches to 2½ inch socket adaptor.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances, e.g., within two thousandths of an inch in exemplary embodiments disclosed herein, etc. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A socket adaptor comprising:
   a body configured to be received within a drive socket receptacle of an impact socket;
   a receptacle defined by the body and configured to receive an anvil of an impact tool therein; and
   at least one hole defined by the body and configured to be alignable with a corresponding hole in the anvil and a corresponding hole in the impact socket, where by at least a portion of a keeper is insertable through the aligned holes of the impact socket, the socket adaptor, and the anvil for retaining the impact socket to the anvil of the impact tool;
   wherein the body of the socket adaptor includes four sidewalls defining a generally square shape with outside rounded corners, the four sidewalls having inner surfaces that define the receptacle to have a generally square shape with inside rounded corners.

2. The socket adaptor of claim 1, wherein the socket adaptor includes a flange or shoulder along an upper portion of the socket adaptor.

3. The socket adaptor of claim 2, wherein
   the flange or shoulder has a generally circular shape.

4. The socket adaptor of claim 2, wherein the socket adaptor includes one or more tapered, chamfered, and/or angled inner surfaces that define an inner transition from the flange or shoulder into the receptacle of the socket adaptor, whereby the inner transition is configured to facilitate insertion of the anvil of the impact tool into the receptacle of the socket adaptor.

5. A socket adaptor comprising:
   a body configured to be received within a drive socket receptacle of an impact socket;
   a receptacle defined by the body and configured to receive an anvil of an impact tool therein; and
   at least one hole defined by the body and configured to be alignable with a corresponding hole in the anvil and a corresponding hole in the impact socket, where by at least a portion of a keeper is insertable through the aligned holes of the impact socket, the socket adaptor, and the anvil for retaining the impact socket to the anvil of the impact tool;
   wherein the socket adaptor includes a flange or shoulder along an upper portion of the socket adaptor;
   wherein the socket adaptor includes one or more tapered, chamfered, and/or angled inner surfaces that define an inner transition from the flange or shoulder into the receptacle of the socket adaptor, whereby the inner transition is configured to facilitate insertion of the anvil of the impact tool into the receptacle of the socket adaptor;
   wherein the inner transition defines an angle relative to the body of the socket adaptor within a range from about 20 degrees to about 45 degrees.

6. The socket adaptor of claim 2, wherein the socket adaptor includes one or more tapered, chamfered, and/or angled outer surfaces that define an outer transition from the flange or shoulder to the body of the socket adaptor, whereby the outer transition is configured to facilitate insertion of the body of the socket adaptor into the drive socket receptacle of the impact socket.

7. A socket adaptor comprising:
   a body configured to be received within a drive socket receptacle of an impact socket;
   a receptacle defined by the body and configured to receive an anvil of an impact tool therein; and
   at least one hole defined by the body and configured to be alignable with a corresponding hole in the anvil and a corresponding hole in the impact socket, whereby at least a portion of a keeper is insertable through the aligned holes of the impact socket, the socket adaptor, and the anvil for retaining the impact socket to the anvil of the impact tool;
   wherein the socket adaptor includes a flange or shoulder along an upper portion of the socket adaptor;
   wherein the socket adaptor includes one or more tapered, chamfered, and/or angled outer surfaces that define an outer transition from the flange or shoulder to the body of the socket adaptor, whereby the outer transition is configured to facilitate insertion of the body of the socket adaptor into the drive socket receptacle of the impact socket; and wherein the outer transition defines an angle relative to the body of the socket adaptor within a range from about 20 degrees to about 45 degrees.

8. The socket adaptor of claim 6, wherein the outer transition is configured to have a radius of about 0.4 inches.

9. The socket adaptor of claim 2, wherein the socket adaptor includes:
one or more tapered, chamfered, and/or angled inner surfaces that define an inner transition from the flange or shoulder into the receptacle of the socket adaptor; and
one or more tapered, chamfered, and/or angled outer surfaces that define an outer transition from the flange or shoulder to the body of the socket adaptor.

10. The socket adaptor of claim 9, wherein:
the inner transition is configured to facilitate insertion of the anvil of the impact tool into the receptacle of the socket adaptor; and
the outer transition is configured to facilitate insertion of the body of the socket adaptor into the drive socket receptacle of the impact socket.

11. The socket adaptor of claim 9, wherein the inner transition and the outer transition are configured to have substantially matching radii of curvatures and/or define substantially similar angles.

12. A socket adaptor comprising:
a body configured to be received within a drive socket receptacle of an impact socket;
a receptacle defined by the body and configured to receive an anvil of an impact tool therein; and
at least one hole defined by the body and configured to be alignable with a corresponding hole in the anvil and a corresponding hole in the impact socket, whereby at least a portion of a keeper is insertable through the aligned holes of the impact socket, the socket adaptor, and the anvil for retaining the impact socket to the anvil of the impact tool;
wherein the socket adaptor includes:
a flange or shoulder along an upper portion of the socket adaptor;
one or more tapered, chamfered, and/or angled inner surfaces that define an inner transition from the flange or shoulder into the receptacle of the socket adaptor; and
one or more tapered, chamfered, and/or angled outer surfaces that define an outer transition from the flange or shoulder to the body of the socket adaptor;
wherein:
the inner transition defines an angle relative to the body of the socket adaptor within a range from about 20 degrees to about 45 degrees; and/or
the outer transition defines an angle relative to the body of the socket adaptor within a range from about 20 degrees to about 45 degrees.

13. A socket adaptor comprising:
a body configured to be received within a drive socket receptacle of an impact socket;
a receptacle defined by the body and configured to receive an anvil of an impact tool therein; and
at least one hole defined by the body and configured to be alignable with a corresponding hole in the anvil and a corresponding hole in the impact socket, whereby at least a portion of a keeper is insertable through the aligned holes of the impact socket, the socket adaptor, and the anvil for retaining the impact socket to the anvil of the impact tool;
wherein the socket adaptor is usable with each of a first impact socket including a first sloped surface defining a first angle into a first socket receptacle of the first impact socket, a second impact socket including a second sloped surface defining a second angle, different than the first angle, into a second socket receptacle of the second impact socket, and a third impact socket including a third sloped surface defining a third angle, different than the first and second angles, into a third socket receptacle of the third impact socket.

14. The socket adaptor of claim 13, wherein the body of the socket adaptor includes four sidewalls defining a generally square shape with outside rounded corners, the four sidewalls having inner surfaces that define the receptacle to have a generally square shape with inside rounded corners.

15. The socket adaptor of claim 1, wherein:
the body is configured such that the outside rounded corners have a radius of about 0.15 inches; and/or
the receptacle is configured such that the inside rounded corners have a radius of about 0.05 inches.

16. The socket adaptor of claim 1, wherein the socket adaptor includes two aligned holes defined by the body and configured to be alignable with one corresponding hole through the anvil and two corresponding holes in the impact socket, whereby a single keeper is usable for retaining the impact socket to the anvil of the impact tool when the two aligned holes of the socket adaptor are aligned with the two corresponding holes in the impact socket and with the one corresponding hole through the anvil, and at least a portion or all of the single keeper is inserted through the rive aligned holes of the impact socket, the socket adaptor, and the anvil.

17. The socket adaptor of claim 1, wherein:
the socket adaptor is configured to form a flush connection between the impact tool and the impact socket when the socket adaptor is being used to retain the impact socket to the anvil of the impact tool; and/or
the socket adaptor is made from a low alloy steel containing chromium, molybdenum, and manganese; and/or
the socket adaptor comprises a ¾ inch to 1 inch socket adaptor, a 1 inch to 1½ inch socket adaptor, or a 1½ to 2½ inch socket adaptor.

18. An assembly comprising the socket adaptor of claim 1 and the keeper including at least a portion configured to be inserted through the aligned holes of the impact socket, the socket adaptor, and the anvil for retaining the impact socket to the anvil of the impact tool.

19. A method of retaining an impact socket to an anvil of an impact tool, the method comprising:
positioning a socket adaptor relative to a drive socket receptacle of the impact socket and an anvil of the impact tool such that:
a body of the socket adaptor is received within the drive socket receptacle of the impact socket;
the anvil of the impact tool is received within a receptacle defined by the body of the socket adaptor; and
at least one hole defined by the body of the socket adaptor is aligned with a corresponding hole in the anvil and a corresponding hole in the impact socket; and inserting at least a portion of a keeper through the aligned holes of the impact socket, the socket adaptor, and the anvil for retaining the impact socket to the anvil of the impact tool;

wherein the body of the socket adaptor includes four sidewalls defining a generally square shape with outside rounded corners, the four sidewalls having inner surfaces that define the receptacle to have a generally square shape with inside rounded corners.

20. The method of claim 19, wherein:

the at least one hole of the socket adaptor includes two aligned holes defined by the body and configured to be alignable with two corresponding holes in the impact socket and one corresponding hole through the anvil;

positioning the socket adaptor relative to the drive socket receptacle of the impact socket and the anvil of the impact tool comprises aligning the two holes of the socket adaptor with the two corresponding holes in the impact socket and the one corresponding hole in the anvil; and inserting at least a portion of the keeper through the aligned holes of the impact socket, the socket adaptor, and the anvil comprises inserting the at least a portion or all of the keeper through the five aligned holes of the impact socket, the socket adaptor, and the anvil.

21. The socket adaptor of claim 1, wherein the at least one hole of the socket adaptor comprises two aligned holes defined by the body and configured to be alignable with one corresponding hole through the anvil and two corresponding holes in the impact socket, whereby the keeper is usable for retaining the impact socket to the anvil of the impact tool when the two aligned holes of the socket adaptor are aligned with the two corresponding holes in the impact socket and with the corresponding hole through the anvil, and at least a portion or all of the keeper is inserted through the five aligned holes of the impact socket, the socket adaptor, and the anvil.

22. The socket adaptor of claim 1, wherein the socket adaptor is configured such that the socket adaptor does not lengthen and/or add length to an overall combined tool length of the impact socket and the anvil when the socket adaptor is being used to retain the impact socket to the anvil of the impact tool and the body of the socket adaptor is within the drive socket receptacle of the impact socket and the anvil of the impact tool is within the receptacle defined by the body of the socket adaptor.

23. The socket adaptor of claim 1, wherein the socket adaptor is usable with at least a first impact socket and a second impact socket having a different configuration than the first impact socket, and wherein:

the first impact socket has a different size than the second impact socket; and/or the first impact includes a first sloped surface defining a first angle into a first socket receptacle of the first impact socket, and the second impact socket includes a second sloped surface defining a second angle, different than the first angle, into a second socket receptacle of the second impact socket.

24. The socket adaptor of claim 5, wherein:

the at least one hole of the socket adaptor comprises two aligned holes defined by the body and configured to be alignable with one corresponding hole through the anvil and two corresponding holes in the impact socket, whereby the keeper is usable for retaining the impact socket to the anvil of the impact tool when the two aligned holes of the socket adaptor are aligned with the two corresponding holes in the impact socket and with the corresponding hole through the anvil, and at least a portion or all of the keeper is inserted through the five aligned holes of the impact socket, the socket adaptor, and the anvil; and/or the body of the socket adaptor includes four sidewalls defining a generally square shape with outside rounded corners, the four sidewalls having inner surfaces that define the receptacle to have a generally square shape with inside rounded corners.

25. The socket adaptor of claim 7, wherein:

the at least one hole of the socket adaptor comprises two aligned holes defined by the body and configured to be alignable with one corresponding hole through the anvil and two corresponding holes in the impact socket, whereby the keeper is usable for retaining the impact socket to the anvil of the impact tool when the two aligned holes of the socket adaptor are aligned with the two corresponding holes in the impact socket and with the corresponding hole through the anvil, and at least a portion or all of the keeper is inserted through the five aligned holes of the impact socket, the socket adaptor, and the anvil; and/or the body of the socket adaptor includes four sidewalls defining a generally square shape with outside rounded corners, the four sidewalls having inner surfaces that define the receptacle to have a generally square shape with inside rounded corners.

26. The socket adaptor of claim 12, wherein:

the at least one hole of the socket adaptor comprises two aligned holes defined by the body and configured to be alignable with one corresponding hole through the anvil and two corresponding holes in the impact socket, whereby the keeper is usable for retaining the impact socket to the anvil of the impact tool when the two aligned holes of the socket adaptor are aligned with the two corresponding holes in the impact socket and with the corresponding hole through the anvil, and at least a portion or all of the keeper is inserted through the five aligned holes of the impact socket, the socket adaptor, and the anvil; and/or the body of the socket adaptor includes four sidewalls defining a generally square shape with outside rounded corners, the four sidewalls having inner surfaces that define the receptacle to have a generally square shape with inside rounded corners.

27. The socket adaptor of claim 13, wherein the socket adaptor is usable with each of:

the first impact socket that includes the first sloped surface defining the first angle of about 20 degrees into the first socket receptacle of the first impact socket;

the second impact socket including the second sloped surface defining the second angle of about 30 degrees into the second socket receptacle of the second impact socket; and the third impact socket including the third sloped surface defining the third angle of about 45 degrees into the third socket receptacle of the third impact socket.

28. The socket adaptor of claim 13, wherein:

the at least one hole of the socket adaptor comprises two aligned holes defined by the body and configured to be alignable with one corresponding hole through the anvil and two corresponding holes in the impact socket, whereby the keeper is usable for retaining the impact socket to the anvil of the impact tool when the two aligned holes of the socket adaptor are aligned with the two corresponding holes in the impact socket and with the corresponding hole through the anvil, and at least a portion or all of the keeper is inserted through the five aligned holes of the impact socket, the socket adaptor, and the anvil; and/or the body of the socket adaptor includes four sidewalls defining a generally square shape with outside rounded corners, the four sidewalls having inner surfaces that define the receptacle to have a generally square shape with inside rounded corners.

29. The socket adaptor of claim 13, wherein the socket adaptor includes a flange or shoulder along an upper portion of the socket adaptor, and wherein the socket adaptor further includes:

one or more tapered, chamfered, and/or angled inner surfaces that define an inner transition from the flange or shoulder into the receptacle of the socket adaptor, the inner transition defining an angle relative to the body of the socket adaptor within a range from about 20 degrees to about 45 degrees; and/or one or more tapered, chamfered, and/or angled outer surfaces that define an outer transition from the flange or shoulder to the body of the socket adaptor, the outer transition defining an angle relative to the body of the socket adaptor within a range from about 20 degrees to about 45 degrees.

* * * * *

UNITED STATES PATENT AND TRADEMARK OFFICE
CERTIFICATE OF CORRECTION

PATENT NO. : 11,597,062 B2
APPLICATION NO. : 17/474976
DATED : March 7, 2023
INVENTOR(S) : Gary Raymond Krupey It is certified that error appears in the above-identified patent and that said Letters Patent is hereby corrected as shown below:

In the Claims

<u>Claim 16</u>
Column 12; Line 36: after "the" and before "aligned" replace "rive" with "five"

Signed and Sealed this
Seventh Day of November, 2023

*Katherine Kelly Vidal*

Katherine Kelly Vidal
*Director of the United States Patent and Trademark Office*